(12) United States Patent
Harding et al.

(10) Patent No.: US 12,227,322 B2
(45) Date of Patent: Feb. 18, 2025

(54) DRAFT HANDLER SYSTEM

(71) Applicant: JLS Automation, York, PA (US)

(72) Inventors: Ken Harding, Lancaster, PA (US); Corey Wagner, Glen Rock, PA (US)

(73) Assignee: JLS Automation, York, PA (US)

( * ) Notice: Subject to any disclaimer, the term of this patent is extended or adjusted under 35 U.S.C. 154(b) by 871 days.

(21) Appl. No.: 17/205,168

(22) Filed: Mar. 18, 2021

(65) Prior Publication Data

US 2022/0297948 A1    Sep. 22, 2022

(51) Int. Cl.
| | | |
|---|---|---|
| *B65B 25/06* | (2006.01) | |
| *B25J 9/00* | (2006.01) | |
| *B25J 11/00* | (2006.01) | |
| *B25J 15/00* | (2006.01) | |
| *B65B 5/06* | (2006.01) | |
| *B65B 35/16* | (2006.01) | |
| *B65B 35/58* | (2006.01) | |
| *B65G 47/244* | (2006.01) | |
| *B65G 47/90* | (2006.01) | |

(52) U.S. Cl.
CPC .......... *B65B 25/065* (2013.01); *B25J 9/0093* (2013.01); *B25J 11/0045* (2013.01); *B25J 15/0014* (2013.01); *B65B 5/068* (2013.01); *B65B 35/16* (2013.01); *B65B 35/58* (2013.01); *B65G 47/244* (2013.01); *B65G 47/902* (2013.01)

(58) Field of Classification Search
CPC ....... B65B 25/065; B65B 35/16; B65B 35/24; B65B 35/58; B65B 61/20; B65B 61/22; B25J 9/0093; B25J 11/0045; B25J 15/0014; B65G 47/22; B65G 47/244; B65G 47/32; B65G 47/90; B65G 47/902; Y10S 53/01

USPC ..................... 53/155, 156, DIG. 1
See application file for complete search history.

(56) References Cited

U.S. PATENT DOCUMENTS

| | | | |
|---|---|---|---|
| 4,328,657 A * | 5/1982 | Brandmaier et al. ....................... B65B 25/065 271/166 | |
| 4,342,182 A * | 8/1982 | Dennis et al. ........ B65B 25/065 493/418 | |
| 8,414,044 B2 * | 4/2013 | Weber .................. B25J 15/0014 294/81.54 | |
| 8,632,110 B2 | 1/2014 | Waizenegger | |
| 9,663,254 B2 * | 5/2017 | Sdahl et al. .......... B65B 25/065 | |
| 11,027,921 B2 * | 6/2021 | Cole et al. ............ B25J 15/0014 | |
| 2018/0244012 A1 * | 8/2018 | Ward et al. ........... B65B 25/065 | |

(Continued)

FOREIGN PATENT DOCUMENTS

JP     57166219 A  * 10/1982    .......... B65G 47/902

OTHER PUBLICATIONS

Vanguard Products Corporation, "Silicone's Properties and Advantages for Molded and Extruded Rubber", https://www.vanguardproducts.com/blog/silicone-properties/, Aug. 22, 2019, 13 pages. (Year: 2019).*

*Primary Examiner* — Stephen F. Gerrity
(74) *Attorney, Agent, or Firm* — Barley Snyder

(57) ABSTRACT

The invention relates to a draft handler. The draft handler has a tool stem adapter for coupling to a robotic arm, and has a spatula for lifting a draft product and an elastomeric band for gripping the draft product. The robotic arm moves the draft handler to pick up the draft product in a first orientation from a first conveyor assembly, and to place the draft product on a second conveyor assembly, optionally in a second orientation.

7 Claims, 20 Drawing Sheets

(56) References Cited

U.S. PATENT DOCUMENTS

2022/0017316 A1* 1/2022 Tiwary et al. ......... B25J 9/0084

* cited by examiner

DRAFT HANDLER SYSTEM

FIELD OF THE INVENTION

The invention is related to a handler for a draft product, for example, a bacon shingle, and an automated method capable of reversing the orientation of the draft product on a conveyor line if needed, and more particularly to an end of arm tool for automated handling of a draft product on a sanitary L-board through the use of a robotic arm.

BACKGROUND

Food products, such as sliced meats, particularly bacon as the most prominent example, are often provided as shingles, characterized by having the product in sliced form and partially fanned out in groups by weight, with overlapping of a slice over the edge of an adjacent slice, in a manner reminiscent of roofing or siding shingles. The shingle form of a product can be readily seen with reference to a common one-pound package of raw bacon, as depicted in FIG. 4. To produce the bacon in such form, a frozen pork belly is run through a slicing machine, which outputs a series of product slices, each of which may be collectively referred to as a draft, which is often presented in the form a shingle 10 by placing the draft onto a sanitary L-board 20. The L-board 20 provides a base board 26 that can support the dimensions of the shingle 10, and may be folded at a hinge 24 to provide that the pivotable flap 22, also known as the return, is folded over to at least partially cover the upper surface of the draft. Portions of the L-board return 22 may be printed or have graphics or information printed thereon. For example, the visible portions of L-board for a shingle are printed on the topside of the return, as well as the underside of the board to display manufacturer information, logo, and nutritional information for the product. The L-board 20 may have one or more back windows 28 in the base board 26 that allows visibility of the underside of the shingle 10. The L-board 20 and draft 10 may be hermetically sealed for long term storage and display in a manner that can prevent the packaged product from exposure to oxygen, delay spoiling, and further prevent leaking or contamination of the contents of the package.

The products provided as shingles are commonly handled by automated mechanical devices in facilities to achieve the high volumes and at rapid speeds. Such facilities may include food manufacturing plants, or other distribution or handling facilities. As part of the manufacturing, current technology provides a card dispenser module that can be incorporated as a module in an automated production line. A card dispenser provides for the automated insertion of an L-board underneath the draft on a moving conveyor system. The card dispenser stages an L-board at a location where the conveyor surface steps down, such that the leading edge of the draft advancing on the conveyor will land on the leading edge of the L-board, on the moving conveyor belt system. Notably, the card dispenser provides the L-board with the return flap in a flat (unfolded) configuration, and located at the trailing edge of the card, relative to the direction of travel on the conveyor. A problem with the current common handling procedure for such food products presented in shingle form is the need to reverse the orientation of the product on the L-board, and fold the return over the product, such that the hinge of the L-board becomes the leading edge, such that the product is in a proper orientation to be placed into a thermoformer for sealing and final packaging. Current manufacturing process typically requires the L-board and drafts to by manually rotated into the proper orientation, usually through 180 degrees of rotation, and further, manually fold over the return flap of the L-board to rest upon the top surface of the draft. The manual intervention in an otherwise automated process may require several workers at this stage in order to keep pace with the automated procedures (often exceeding 60 drafts/minute), and therefore is demanding upon the personnel, as well as resulting in greater variation in end products, delays, and errors that can interfere with the efficient processing of product to final packaging.

What is needed is an automated method and suitable automation module for reliably folding over the return flap, and further be capable of re-orientating the L-board with the draft product, such that the product is aligned properly for placement into the thermoforming or other suitable equipment for final packaging, such that continuous automation can be applied for production, sealing, and packaging of the product. Such an automated method requires the draft product to be picked up quickly and reliably, transported to a second location, and deposited accurately at the desired location.

SUMMARY

A draft handler according to the invention has a tool stem adapter for mounting to a robotic arm; a spatula capable of being moved relative to the position of the tool stem adapter, and an elastomeric band extended between a pair of band frame components, the elastomeric band having a leading edge and a grip surface, the leading edge configured to urge an L-board return into an acute angle with a generally forward motion of the draft handler, and the grip surface configured to be pushed against and conform to the upper surface of a draft with a generally downward motion of the draft handler.

In an exemplary embodiment, the draft handler has a first pneumatic cylinder configured to reversibly tilt the spatula relative to the tool stem adapter, and a second pneumatic cylinder configured to reversibly translate the spatula in a longitudinal direction between a first position and a second position. The spatula, while in the first position, is located behind the elastomeric band, and while in the second position, the spatula is advanced to be positioned at least partially below the elastomeric band. In an embodiment, the spatula in the second position is positioned below the draft, and the elastomeric band is positioned above the draft.

In an exemplary embodiment, the draft handler further comprising a slide rail, a slide mount, and a spatula bracket securing the spatula to the slide mount. The draft handler may further have a pair of band frame arms each having band brackets at the ends thereof and the band brackets are configured to securely grip an end of the elastomeric band.

In an exemplary embodiment, the slide mount is configured to reversibly move along a portion of the length of the slide rail in response to actuation of the second pneumatic cylinder.

In an embodiment, the elastomeric band is a silicone elastomer having a relaxed length, and is capable of being repeatedly stretched up to 150% of the relaxed length, and being capable of elastically seeking to return to its relaxed length.

In an exemplary embodiment, the method of repositioning a draft product in an automated production line includes the steps of:

a. providing: an automated conveyor system comprising a first and second conveyor assemblies; a series of draft products each on an L-board being conveyed on the first conveyor system in a first orientation with a return of the L-board trailing the draft as it is conveyed; a robotic arm coupled to a draft handler and having a working range that includes at least a portion of each of the first and second conveyor assemblies, the first conveyor assembly having a gap in a conveyor surface with a plurality of nozzles configured to deliver a stream of gas upwards through said gap;

b. positioning the robotic arm such that the draft handler is positioned generally near one of the series of draft products on an L-board, the draft handler comprising at least a spatula and an elastomeric band having a leading edge and a gripping surface;

c. actuating at least a portion of the plurality of nozzles underlying the L-board of the draft product to deliver the stream thereby causing the return of the L-board to pivot upwards;

d. repositioning the robotic arm to advance the draft handler and cause the leading edge of the elastomeric band to urge the return beyond vertical orientation, and subsequently positioning the elastomeric band against a top surface of the draft product, such that the gripping surface of the elastomeric band is conformed against and secures the draft product, whereupon the spatula is to be advanced to underlie the draft product;

e. picking up the draft product by raising the robotic arm, and moving the robotic arm to position the draft handler above the second conveyor assembly, optionally rotating and tilting the draft handler; and f. placing the draft product on the second conveyor assembly in a second orientation by retracting the spatula, such that the return of the L-board is near the leading edge of the draft product on the second conveyor assembly.

In an exemplary embodiment, the draft handler further includes a first pneumatic actuator configured to tilt the spatula, and a second pneumatic actuator configured to advance and retract the spatula, and the elastomeric band is a silicone elastomer.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
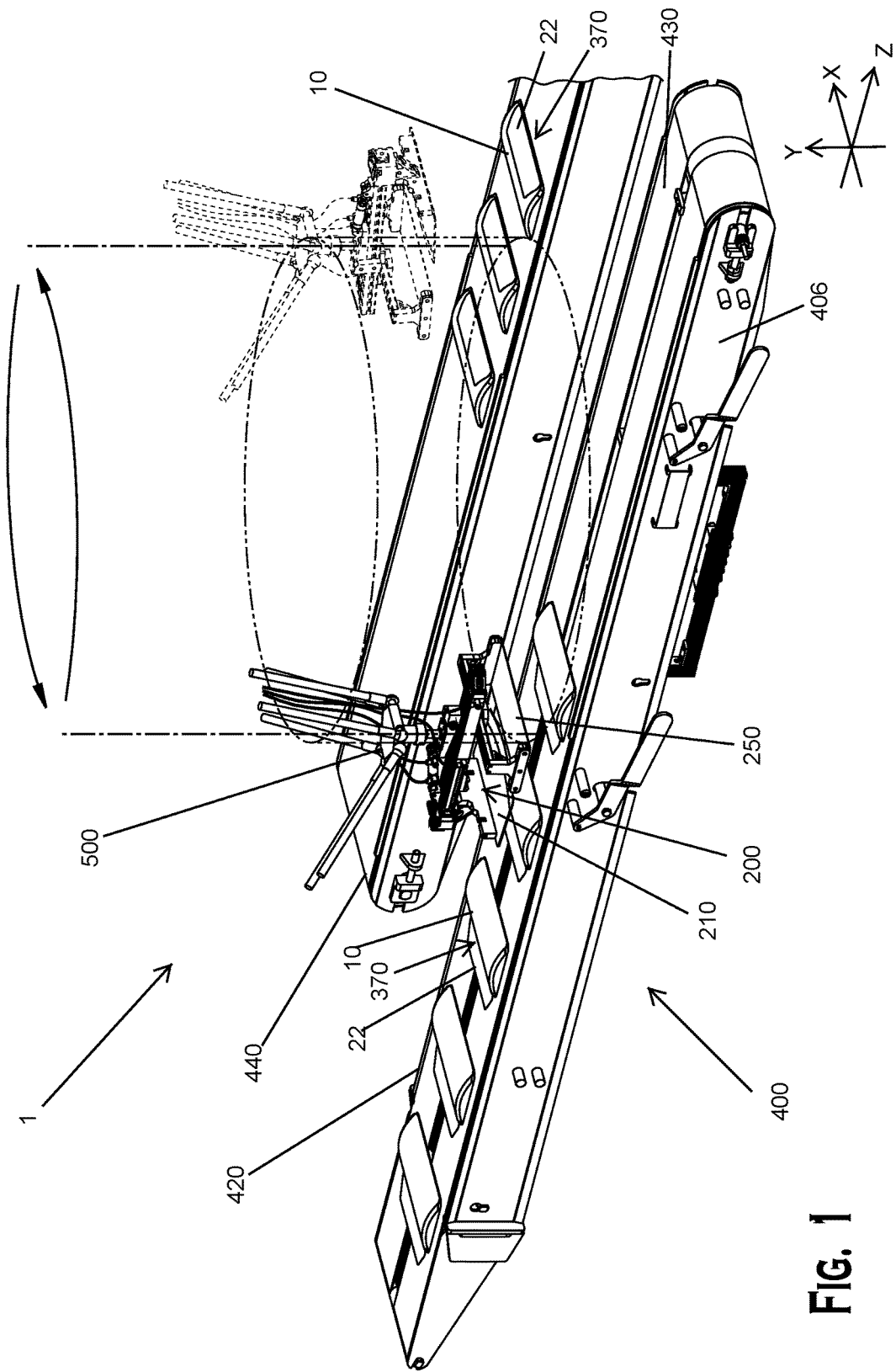
FIG. 1 is a perspective view of a draft handler system according to the invention.

Exemplary embodiments of the invention will be described hereinafter in detail with reference to the attached drawings, wherein like reference numerals refer to like elements.

The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Now with reference to the figures, an exemplary draft handler system 1 according to the invention will be described. Referring first to FIG. 1, the draft handler system 1 generally includes the following major components: a draft handler tool 200, a conveyor system 400 and a robotic arm 500.

Figure 2:
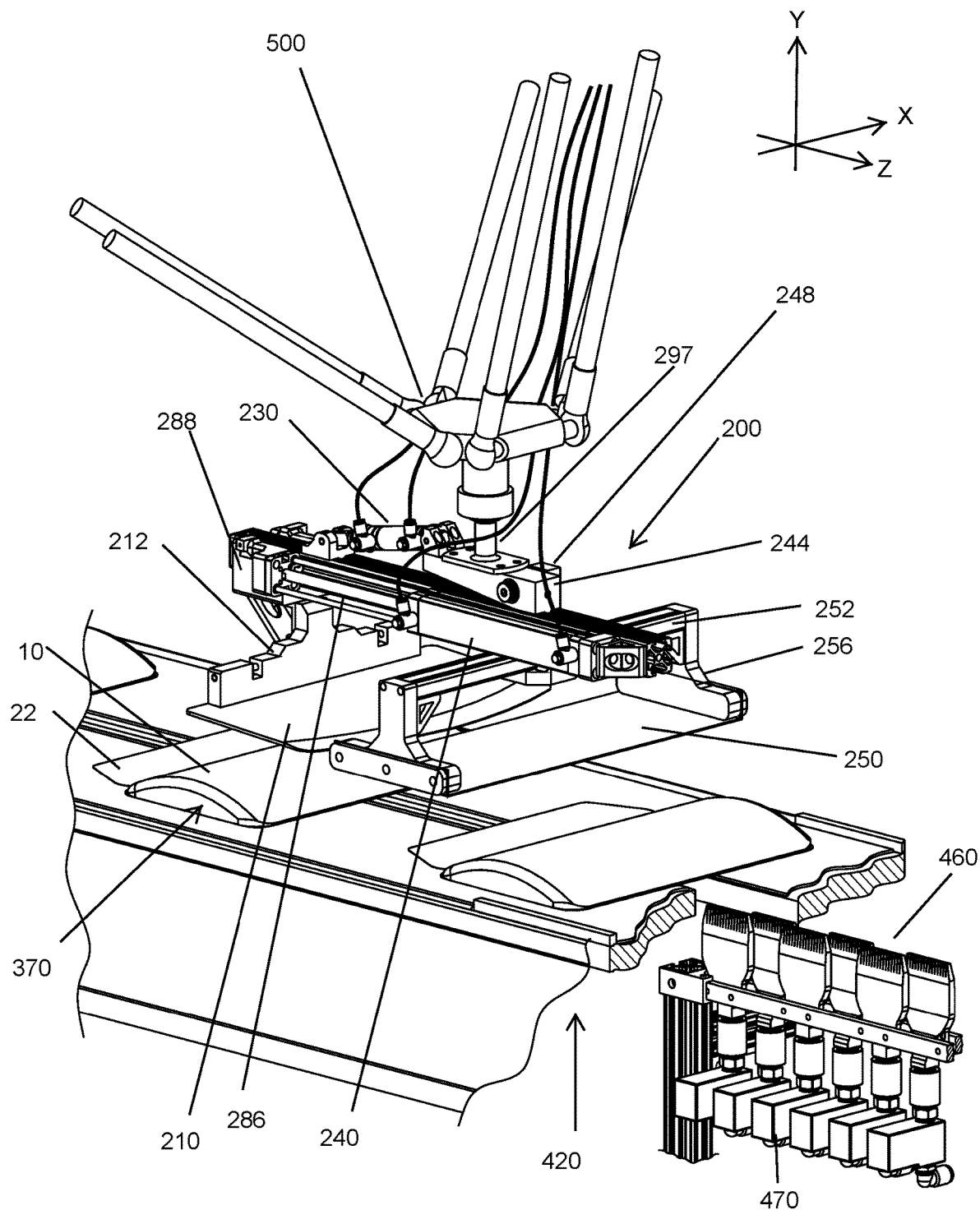
FIG. 2 is an expanded perspective view of a robotic arm coupled to a draft handler tool of the draft handler system of FIG. 1.
Figure 3:
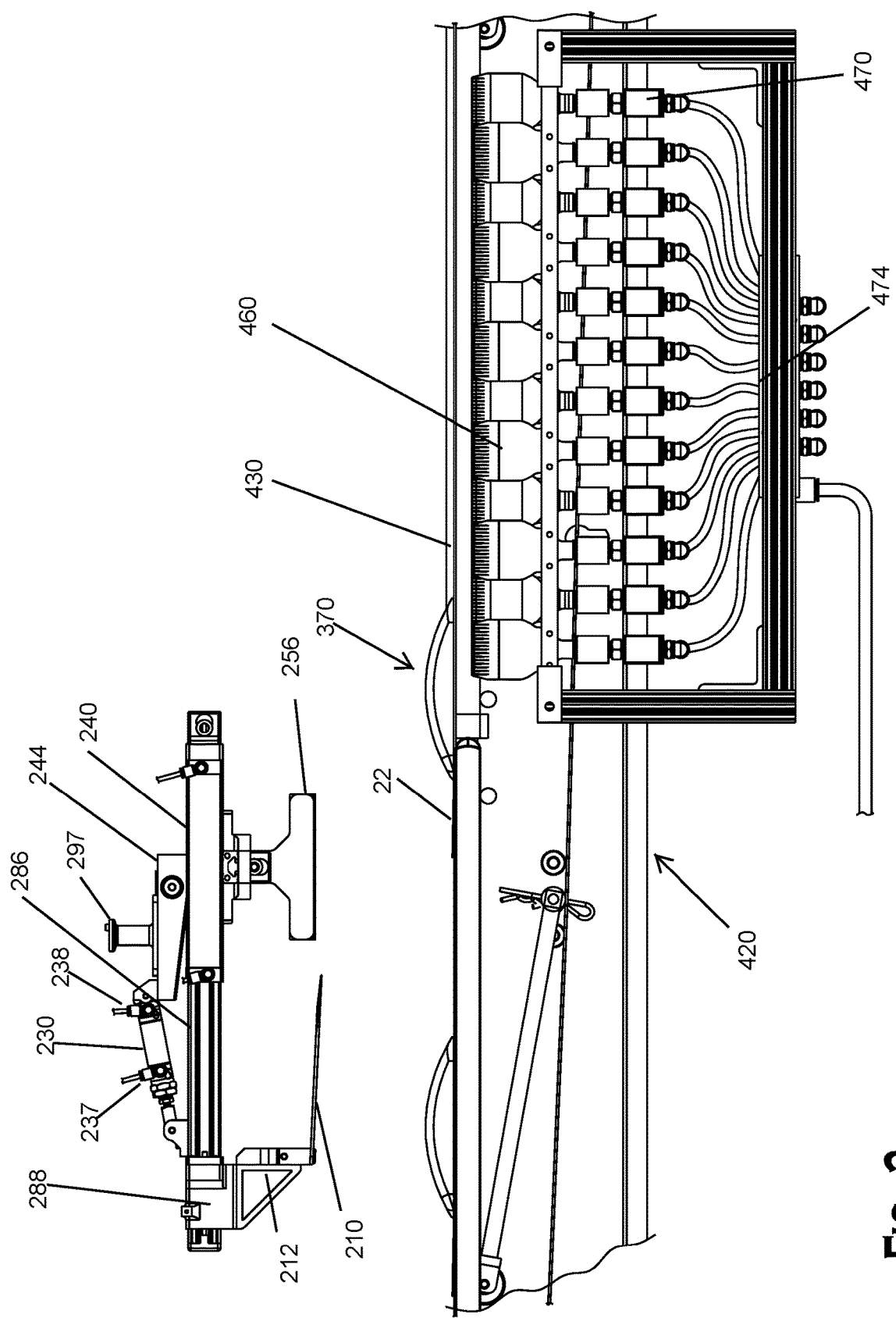
FIG. 3 is side perspective view of a portion of the draft handler system of FIG. 1.

Each of these major components will now be described. Referring to FIGS. 1 through 3, the draft handler tool 200 generally includes a robotic coupler 297 for reversibly mounting the tool to a robotic arm 500, a spatula 210 slidably mounted and supported from one end of a slide rail 286, and an elastomeric band 250 extended between a pair of band frame arms 252 secured at the other end of the slide rail 286, a first pneumatic actuator 230 configured to reversibly tilt the slide rail 286 relative to horizontal, and a second pneumatic actuator 240 to actuate the longitudinal translation of the spatula 210. Details and operation of the draft handler tool 200 will be discussed below.

With reference to FIGS. 1 and 2, the robotic arm 500 can be coupled to and controllably move the draft handler tool 200, for example, at least within a working range of the robotic arm 500, as depicted in FIG. 1. In an embodiment, the robotic arm 500 is capable of moving independently, or in combination, along axes X, Y, Z, thereby allows for horizontal and vertical movements and placement of the draft handler tool 200 within at least the range shown is FIG. 1. The robotic arm 500 may be any suitable unit known to those skilled in the art, such as gantry robots, articulated robots, linear robots, cylindrical robots, SCARA robots, multi-axis robots, or delta robots (as depicted in FIG. 1). As shown in FIGS. 1 and 2, the robotic arm 500 may be a commercially available stainless steel (IP69K rated) delta robot of the type sold by JLS Automation. In an embodiment, the robotic arm 500 may be positioned above the draft handler tool 200. The robotic arm 500 utilizes a controller (not shown) which directs the actions of the robotic arm according to programmed instructions, as will be familiar to those of skill in the art. In the depicted embodiment, the robotic arm 500 is provided with an end of arm tooling component in the form of the draft handler tool 200, which is secured to the robotic arm 500 at a robotic coupler 297 that is reversibly received by the robotic arm 500. The robotic arm 500 thereby allows for controlled movement of the draft handler tool 200 in multiple axes according to program instructions from the computer software controlling the robotic arm.

As can be seen in FIG. 1, the conveyor system 400 has a first conveyor assembly 420, and a second conveyor assembly 440. In an embodiment, the first conveyor assembly is to be placed in an automation line after the card inserter module, such that the drafts arriving onto the first conveyor system are on L-boards, and in a first orientation with the return flap on the trailing edge, as depicted in FIG. 1. Alternatively, it is recognized that upstream handling of the drafts may result in the drafts being provided in a different orientation, such as where the return flap is leading as it is conveyed along the first conveyor assembly (not shown), and enters into the working range of the robotic arm 500 for processing by the draft handler tool 200. For simplicity, the following description will largely refer to the processing as having the drafts provided in a more common initial orientation in which the return flap is located at the trailing edge draft, and one skilled in the art will understand the necessary adjustments to the processing that may be required if the drafts are provided in an alternative orientation. As depicted in FIG. 1 and in cross-section in FIG. 8, the first conveyor assembly 420 extends in a longitudinal z-direction. It has a conveyor lateral side 405 and conveyor lateral side 406, between which are supported a conveyor belt 430 that forms the conveying upper surface as is known with other conveyor systems.

As shown in FIG. 1, the first conveyor assembly is shown conveying the drafts with a direction of movement from left to right. In an embodiment, the first conveyor system may be provided with a longitudinal gap in the conveyor belt, such as may be achieved by providing a pair of conveyor belts, as shown, and allows a plurality of air nozzles 460 arranged to blow a series of air jets up through the gap, as will be discussed. In an embodiment, the first conveyor assembly 420 has a pair of conveyor belts that are spaced apart in an amount that allows the air nozzles 460 to direct the jets therethrough. The gap may be any suitable dimension, such as approximately 1.5 inches in width between the belts 430 of the first conveyor assembly 420, as shown.

The nozzles 460 of the first conveyor assembly 420 are seen in the partial cross-section view of FIG. 2, and in the side-perspective view of FIG. 3. The nozzles are aligned in a bank such that each nozzle in the bank is oriented to direct a jet of air up through the gap in the first conveyor assembly. Each nozzle is connected to and in fluid communication with a manifold 474 that is in turn in fluid communication with a source of compressed gas, such as air. The delivery of compressed gas through each nozzle may be selectively controlled by an automated valve 470, such as an electromechanically operated valve, or solenoid valve that is positioned between the manifold 474 and each of the nozzles 460. As will be familiar to those of skill in the art, operation of each of the valves 470 for each of the nozzles 460 may be controlled by a controller, which may be the same or different than the controller for the robotic arm 500. The manifold then serves to distribute the compressed gas from a single source to each of the nozzles 460. Operation of the nozzles will be discussed below.

The second conveyor assembly 440 is similar to the first conveyor system, in that it also is provided with conveyor lateral sides and supports a moving conveyor belt 430, forming a conveying surface for continued movement of the drafts thereon. The second conveyor assembly 440 need not provide the air nozzles of the first conveyor assembly, and thus may be provided with a single belt, with no gap. Alternatively, it is contemplated that the first and second conveyor assemblies may be substantially the same units, with the system of air nozzles 460 not utilized on the second conveyor assembly.

The robotic arm 500 may position the draft handler tool 200 above each draft in a serial fashion, as the drafts are moved along the first conveyor assembly, such that the draft handler tool 200 can pick up each draft and L-board using the spatula 210 and the elastomeric band 250, as will be discussed. The robotic arm 500 may then move the draft handler tool 200 from the position above the first conveyor assembly 420, and translate laterally to be positioned above the second conveyor assembly 440, and, if necessary, rotating about the Y-axis to the extent necessary, for example 180 degrees to reverse the orientation, using the theta axis of the robotic arm 500, with the rotation, if any, happening any of before, during, or after the lateral translation of the robotic arm 500. In an embodiment, the rotation occurs simultaneously with the lateral translation of the robotic arm 500. The draft handler tool 200 may then place the draft onto the second conveyor assembly 440, as will be discussed.

The second conveyor assembly 440, as shown in FIG. 1, may be arranged at least partially alongside and aligned parallel to the axis of travel of the first conveyor assembly 420. The direction of travel for the second conveyor assembly as depicted, is also such that the drafts continue to travel from left to right, with each of the drafts having being deposited onto the second conveyor assembly in an orientation with the hinge 24 of the L-board 20 as the leading edge.

It is contemplated that the first and second conveyor assemblies 420, 440 need not necessarily be limited to being aligned alongside as shown in FIG. 1, as one skilled in the art will recognize that other placement or angular orientations of the first and second conveyor assemblies are possible, and an alternative placement choice can be made suitable by programming the "pick up" and "placement" locations for the robotic arm 500, as well as the extent of rotation about the theta axis of the robot. Thus any variety of angles between the first and second conveyor assemblies 420, 440 are possible, where the possible angles for each of the first and second conveyor assemblies can be accounted for in the programming of the robotic arm 500. In some embodiments, the processing of the draft will call for the directional orientation of the draft on the L-board to be effectively reversed, to go from an initially provided orientation with the return flap at the trailing edge of the draft (as shown in FIG. 1 on the first conveyor assembly), to a second orientation having the return flap of the L-board near the leading edge, specifically the hinge of the return flap is at the leading edge of the draft (as shown in FIG. 1 on the second conveyor assembly). It is further contemplated that the drafts on the L-board may alternatively be provided in a different orientation for pick up by the robotic arm, for example, by being provided in an orientation where the return flap of the L-board is at the leading edge, and the robotic arm may pick up the product, folding the return flap at the hinge as will be described, and placing the draft onto the second conveyor without needing to reverse the orientation. The flexibility granted through a programmable and movable robotic arm 500 coupled to the draft handler tool 200 can therefore accommodate substantially any initial orientation of the product, as well as any angular and positional relationship between the first and second conveyor assemblies 420, 440, so long as the pick and place locations for the drafts are within the working range of the robotic arm 500. For example, if so desired, the automation line can be configured to make a 90 degree bend, by having the second conveyor assembly 440 aligned perpendicularly to the first conveyor assembly 420. In such an instance, the robotic arm 500 would only need to rotate through 90 degrees in order to adjust the orientation of the draft, relative to the direction of travel on the first and second conveyor assemblies. In an alternative embodiment, the automation line could be provided with the first and second conveyor assemblies 420, 440 in longitudinal alignment end to end, with the robotic arm 500 picking up the product near the end of the first conveyor assembly 420, and placing the draft near the beginning of the second conveyor assembly 440, adjusting the orientation as needed by rotating about the Y axis.

As can be seen with reference to FIG. 2, the draft handler tool 200 attaches to a robotic arm 500 via a robotic coupler 297, which may be any suitable method of securing the tool 200 to the robotic arm 500, such that the draft handler tool 200 can be moved, rotated and positioned accurately by the movements of the robotic arm 500. As shown in the embodiment of FIG. 3, the robotic coupler 297 may feature a flanged tool stem that can be securely received within a corresponding receiver of the robotic arm 500. The robotic coupler 297 may be keyed, such that draft handler tool 200 can be mounted in only one orientation to the robotic arm 500, for example by being provided with a positive engagement feature, shown here as a protruding portion on the flange that is received within the robot to ensure that the draft handler tool 200 is unable to rotate independently of the robotic arm 500.

Figure 18:
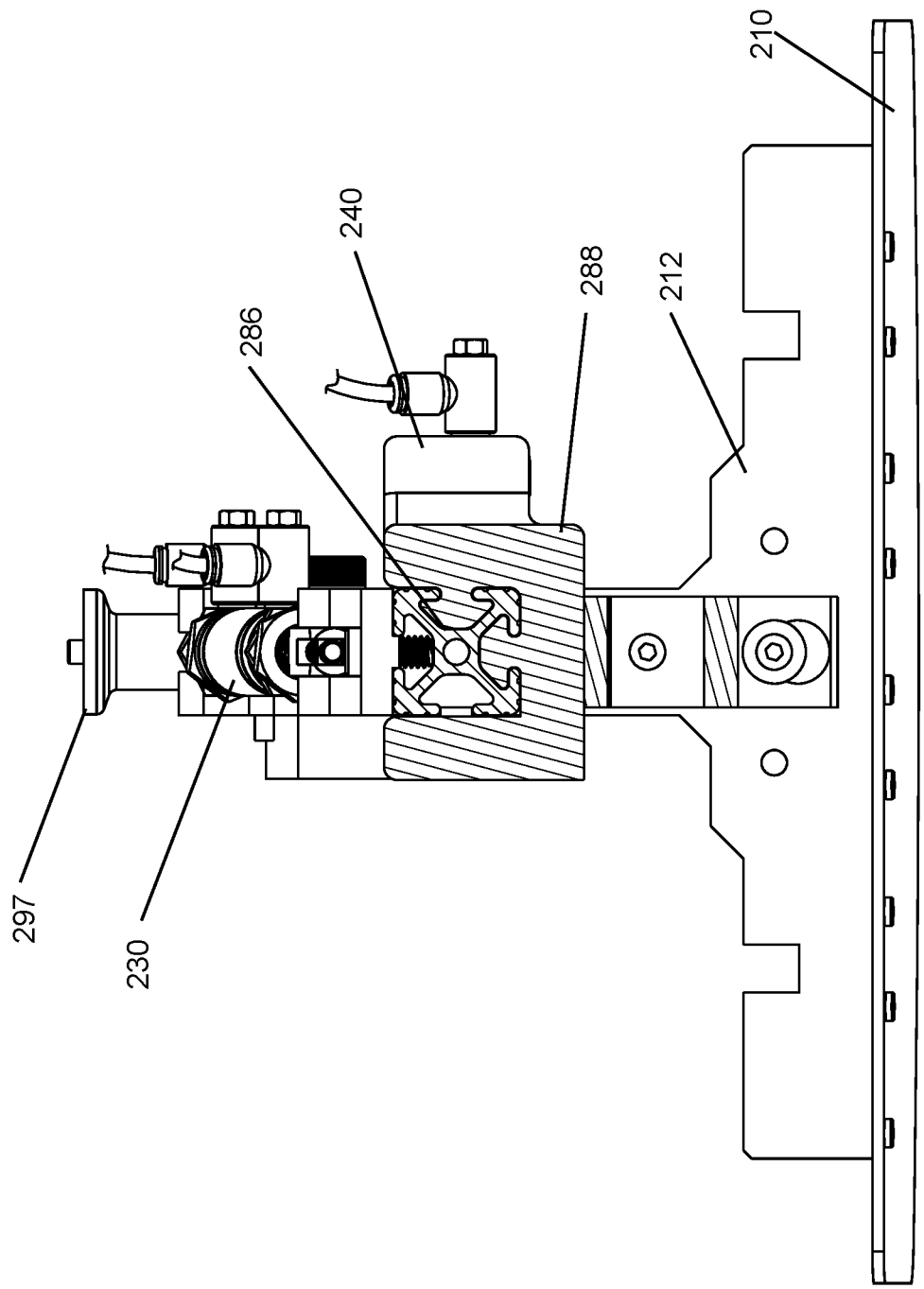
FIG. 18 is a cross-sectional view of the draft handler tool of the present invention taken along the line 18-18 of FIG. 6.
Figure 19:
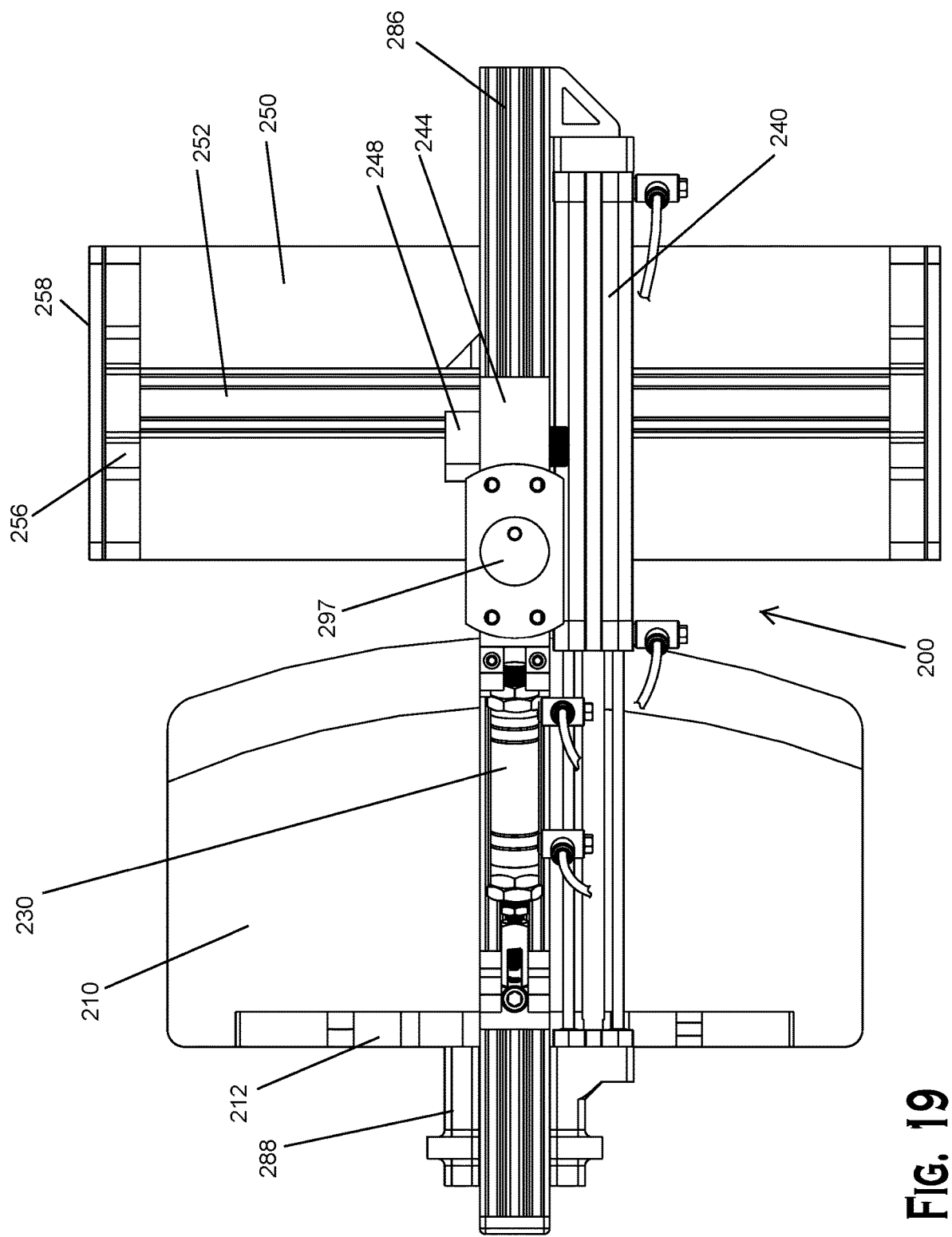
FIG. 19 is a top view of the draft handler tool according to the invention.

The draft handler tool 200 has a slide rail 286 that is oriented parallel to a longitudinal axis of the tool 200, as can be seen with reference to FIGS. 2 and 19, and is mechanically secured to the robotic coupler 297. In an embodiment, the slide rail 286 is a length of linear rail, and may be provided with slots, or fixtures such that additional components can be mounted securely to the rail, as will be known to those of skill in the art. In an embodiment, the slide rail is a length of aluminum extrusion linear rail, having a plurality of T-slots extended along the length on the sides of the slide rail 286, as can be seen with reference to cross sectional view of FIG. 18.

The draft handler tool 200 provides a spatula 210 suitable for being slid underneath a draft on the conveyor assembly, and capable of supporting the weight of the draft while it is being repositioned. In an embodiment, the spatula 210 is able to support the entire width (in an X direction) of the product from below, and substantially support all, or nearly all of the length (in a Z direction) of the product from below. The spatula 210 may be any suitable material, such as polymer or metal that is suitable for contact with food products and can be easily cleaned, such as Polybutylene Terephthalate, Polyoxymethylene, polyethylene, polytetrafluoroethylene, aluminum or stainless steel, as non-limiting examples. The spatula 210 may be provided as broad blade and may be coated, or at least the upper face surface of the spatula 210, may be provided with a coating, such as a non-stick coating or anti-bacterial coating, such as may be useful for sanitary purposes, or to provide enhanced lubricity, allowing the draft 10 and L-board 20 to slide more easily against the top surface of the spatula 210. The spatula 210 is substantially rigid, providing a substantially flat body, and may have a leading arcuate edge that is tapered in thickness, as shown in FIGS. 2 and 3, in cross-section view of FIG. 18, and top view of FIG. 19. The spatula 210 is rigidly secured to a slidable mount 288, by an interconnected spatula bracket 212. As can be seen with reference to FIG. 3, the spatula 210 may be rigidly fixed relative to the slide rail 286, and be somewhat tilted away from being horizontal, when the slide rail 286 is oriented at a horizontal position. In an embodiment, the spatula 210 may be tilted at a small angle, such as less than 5 degrees, less than 2 degrees, or less than 1 degree from horizontal, while the slide rail 286 is at a non-tilted position, so that the leading arcuate edge of the spatula 210 is the lowest part of the spatula, and thus may more easily be advanced underneath the draft 10 and L-board 20. The spatula 210 is able to be reciprocated along a portion of the length of the slide rail 286, as will be discussed.

Figure 17:
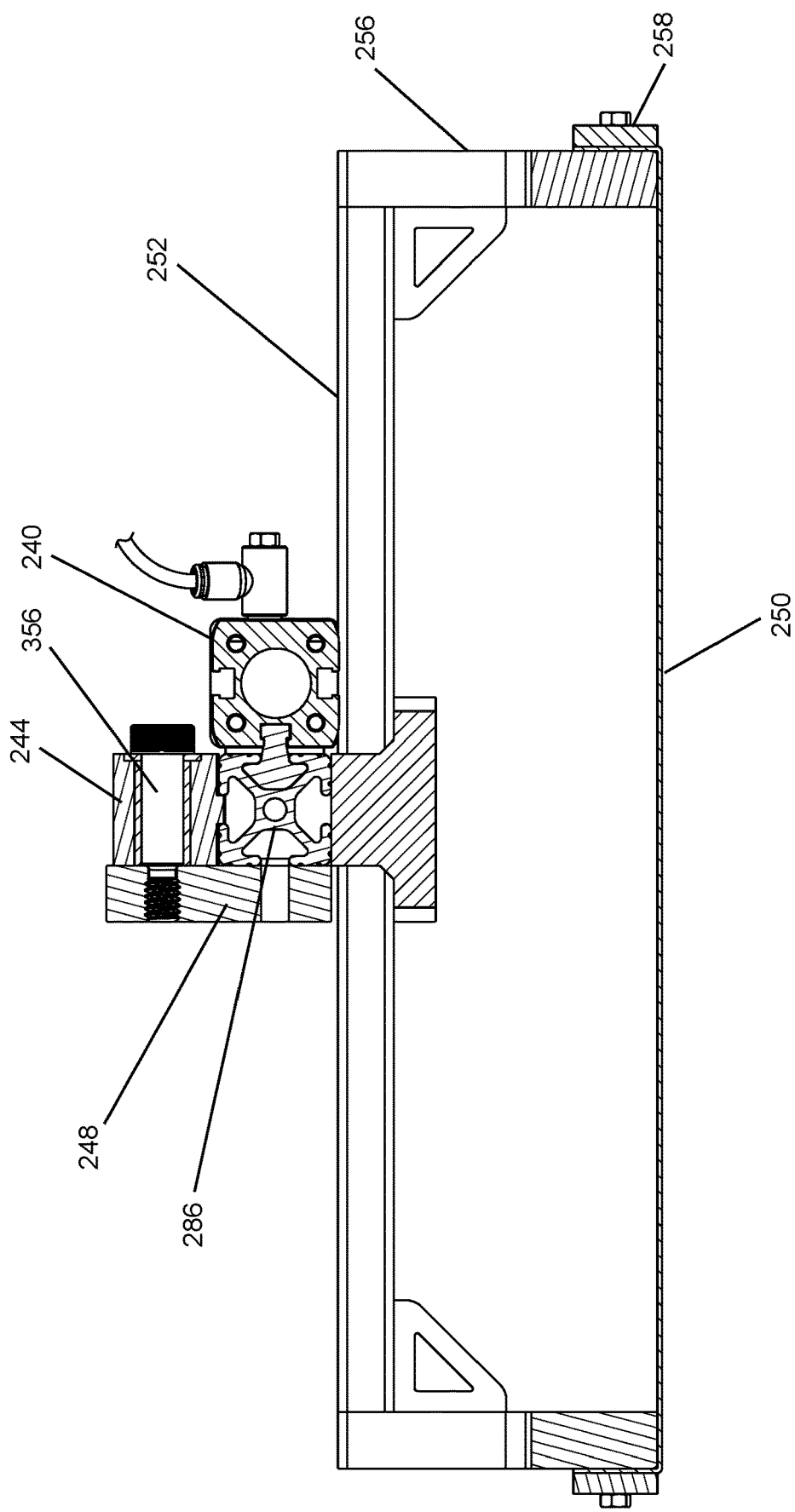
FIG. 17 is a cross-sectional view of the draft handler tool of the present invention taken along the line 17-17 of FIG. 6.

The draft handler tool 200 is also provided with a draft securing means, shown here as an elastomeric band 250 extended between the ends of a pair of band frame arms 252 that are each extended laterally on either side of the slide rail 286, and arranged perpendicular to the longitudinal axis of the draft handler tool 200, as shown in FIG. 2, and in top view of FIG. 19. As shown, the band frame arms 252 may be formed by a frame rail 254 suspended underneath the slide rail 286. Alternatively, the band frame arms 252 may be extended laterally out from the slide rail 286 in any suitable fashion. The band frame arms 252 are each configured to secure the respective end of the elastomeric band 250 in any suitable manner. As depicted in FIG. 2, at the ends of the frame rail 254, there are provided vertically oriented band brackets 256 and at the bottoms of each are clamps 258 or other holding fixtures configured to secure or grip the ends of the elastomeric band 250, as can be seen with reference to FIG. 17. In embodiment, the ends of the elastomeric band are clamped between adjacent clamping surfaces as shown at the bottom of the band brackets 256. In another embodiment, the elastomeric band is provided with one or more slits or openings that can receive a projecting element, such as a hook or mushroom shaped head, thereby preventing the elastomeric band from becoming detached from the band brackets during use. It is contemplated that the elastomeric band may be under tension when fixed to the draft handler tool, such that the elastomeric band has a taut, generally planar portion extended between band brackets 256. The elastomeric band 250 is a flexible, and elastic material, that can repeatedly be stretched up to 50% of its original length, and seek to revert back to its original pre-stretched length. Furthermore, the elastomeric band should be capable of being cleaned, as the elastomeric band will repeatedly be in direct contact with the drafts being repositioned between conveyor assemblies, and should be cleaned and/or replaced as regular maintenance. In an embodiment, the elastomeric band is provided with a gripping surface, such that as the band is caused to conform against the surface features of the product, as will be discussed, the band grips and prevents unwanted movement of the product, for example when the draft handler tool is moved by the robotic arm. In an embodiment, the gripping surface is substantially smooth. In an embodiment, the gripping surface is textured, incorporating surface features to further enhance the grip against the product, such as ribs, or small protrusions. In an embodiment, the elastomeric band has a thickness of from about 1 to about 5 mm. In an embodiment, the elastomeric band 250 is a food grade material and safe for contact with food products. In an embodiment, the elastomeric band 250 is a silicone elastomer material.

The draft handler tool 200 is further provided with a first and second linear actuator 230, 240, each of which may be any suitable form for reversibly extending and retracting components, including electric linear actuators, hydraulic cylinders, or pneumatic cylinders. In the depicted embodiment, there are shown linear actuators in the form of pneumatic cylinders that are driven by gas pressure, such as vacuum or compressed gas, such as air pressure. As depicted, the first pneumatic cylinder 230 has a barrel portion and piston rod portion, and as depicted is positioned above the slide rail 286. The end of the piston rod portion of the first pneumatic cylinder 230 is secured to the slide rail 286. The end of the barrel portion of the first pneumatic cylinder is secured to a main bracket 244 that is rigidly secured relative to the robotic coupler 297. The slide rail 286 is pivotably secured to the main bracket 244, such that slide rail 286 is free to pivot somewhat in a vertical direction (about a horizontal axis), relative to the main bracket 244 when the first pneumatic cylinder 230 is in a retracted state by providing higher pressure at the rod end port 237 than at the cap end port 238. In this state, the shortened length of the first pneumatic cylinder 230 will cause the slide rail 286 to be tilted vertically in an amount that is less than 10 degrees from horizontal, and typically approximately 7 degrees from horizontal. Extension of the first pneumatic cylinder 230 is achieved by reversing the movement of the piston rod such that it is extended out of the barrel portion by providing higher air pressure at the cap end port 238 than at the rod end port 237. When the first cylinder is fully extended, the slide rail is reverted to a horizontal orientation. Regardless of the position of the slide rail 286, the slide rail remains aligned with the longitudinal axis of the draft handler tool 200, when viewed from above the longitudinal axis. The location of the pivot 356 can be seen in FIG. 15.

Figure 13:
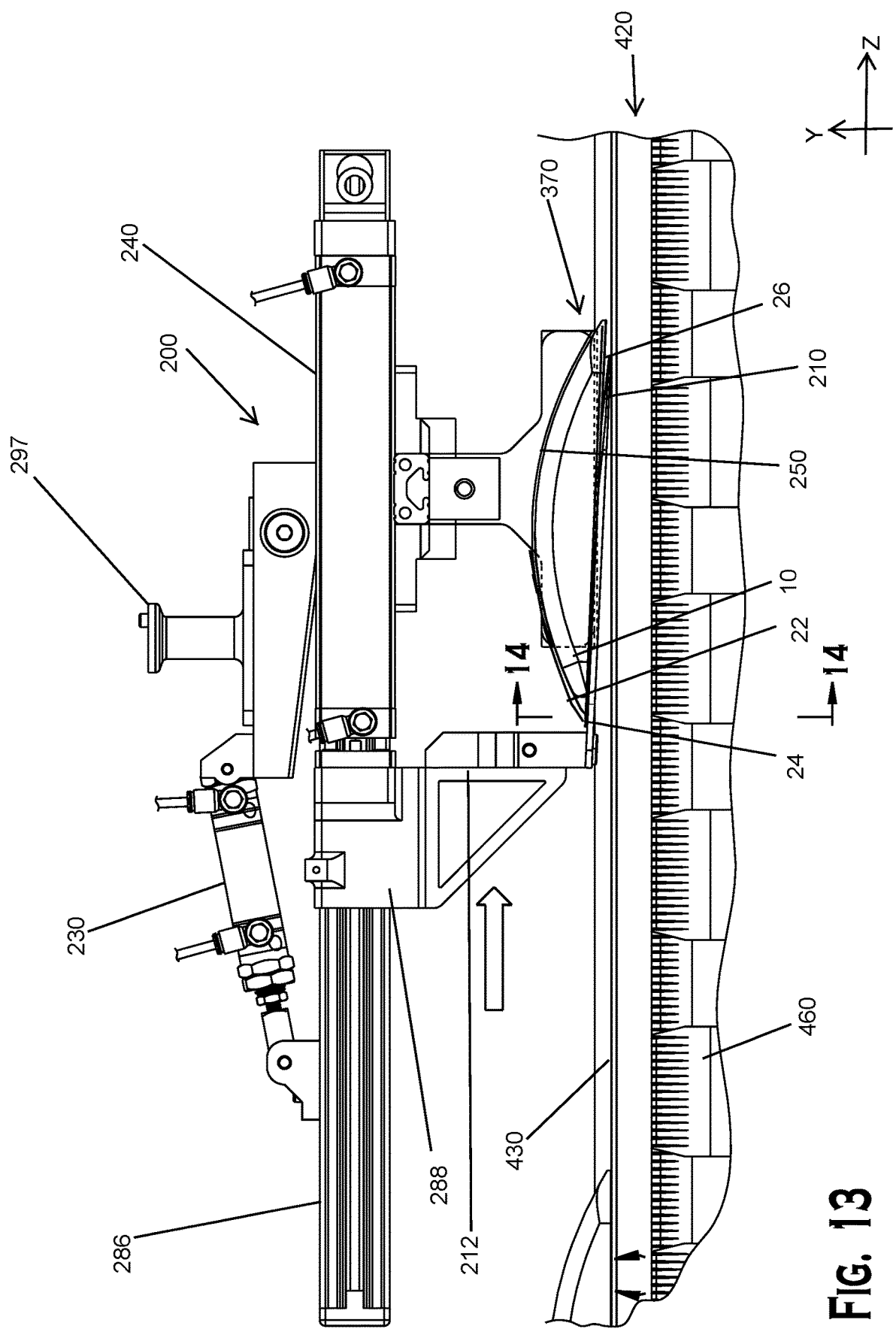
FIG. 13 is a sectional view of the draft handler tool and a portion of the first conveyor assembly of the invention in use.

The second pneumatic cylinder 240, as depicted in FIG. 3 has a barrel portion and a piston rod portion. As depicted in FIG. 2, the second pneumatic cylinder 240 may be mounted in a position along a side of the slide rail 286. The second pneumatic cylinder 240 extends and retracts in similar fashion as described with regard to the first pneumatic cylinder 230 above, and relies on differential pressure introduced at the rod end port and the cap end port to cause the piston rod to be extended out of the barrel, or reversed, so as to retract the piston rod into the barrel. The rod end of the second pneumatic cylinder 240 is secured to the slide mount 288, and the barrel end is rigidly connected to the slide rail 286. The slide mount 288 will be caused to slide along a portion of the length of the slide rail 286, when the second pneumatic cylinder 240 is retracted, thereby advancing the spatula 210 in a direction towards the elastomeric band 250 until the leading end of the spatula 210 is approaching the far end of the elastomeric band, as depicted in FIG. 13. In an embodiment, the spatula 210 is advanced to fit underneath the entirety of the draft, or nearly so, though not advanced so far that the trailing edge of the draft would encounter the spatula bracket 212. The second pneumatic cylinder 240 can be extended back to the initial position by reversing the air pressure differential in the cylinder, such that the piston rod is extended out of the barrel, and pushing the slide mount 288 along the slide rail 286 to its starting position, thereby moving the spatula 210 away from the elastomeric band 250, as shown in FIG. 2.

It is recognized that alternative embodiments may provide revised or altered positional relationships of the components, such that individual components or modules are arranged differently than as described here, to achieve the same functionality, without departing from the spirit of the disclosure. For example, the first or second pneumatic cylinders 230, 240 may be reversed in orientation, and function in a similar manner, in that they extend and retract the piston rod from actuator, as will be familiar to those of skill in the art. Similarly, the positions of the actuators on the draft handler tool 200 may be revised, yet still cause the tilting of the slide rail 286 for the first pneumatic cylinder 230, and the movement of the spatula 210 with the second pneumatic cylinder 240.

Figure 4:
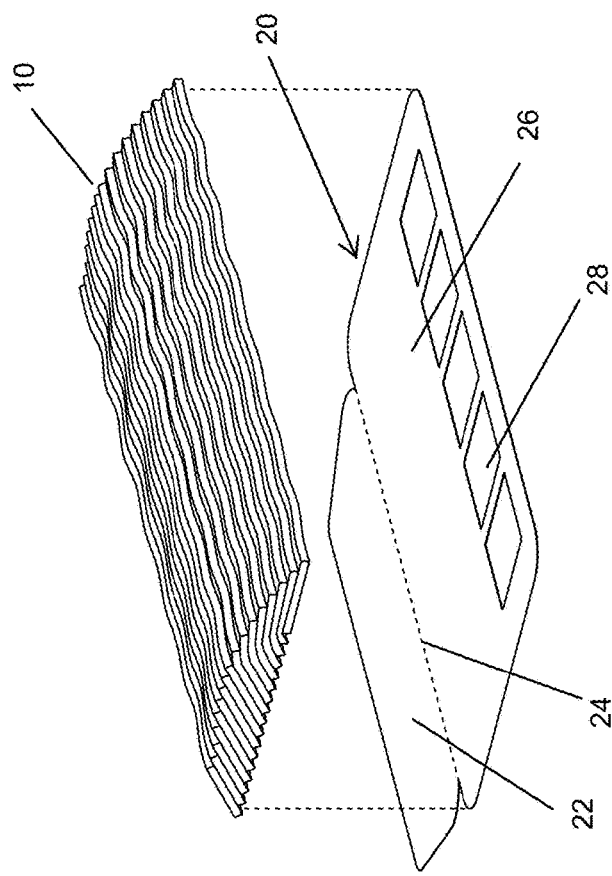
FIG. 4 is an exploded perspective view of a product to be processed on the draft handler system of FIG. 1.

Operation of the draft handler system 1 as shown in the FIGS. 1-22, will now be described. With reference to FIG. 1, the conveyor system 400 is shown having a first conveyor assembly 420, and a second conveyor assembly 440. The top surface of the conveyor belt 430 of the first conveyor assembly 420 is configured to move in the longitudinal z-direction, as shown in a direction from left to right. The first conveyor assembly 430 is shown conveying a plurality of shingles 10, each loaded onto an L-board 20, which may collectively be referred to herein as product 370. In the depicted embodiments, and as can be seen in detail with reference to FIG. 4, the draft may be a sliced product, such as sliced meat, and may be in the form of a shingle 10 having partially overlapping slices. As a non-limiting exemplary embodiment, the sliced product may be a shingle of bacon, though it is recognized that the equipment and methods of the present disclosure could be used with alternative staples, for example, any sliced meats or cheeses that may be presented in draft form and suitable for automated processing as described herein. The first conveyor assembly 420 is to be placed in the production line at a point after the shingle 10 has been placed onto the L-board 20, such as where an automated card inserter module has placed the L-board underneath the draft. In the depicted embodiment, the draft 10 and L-board 20 are presented in a first orientation, with the return flap 22 of the L-board 20 as the trailing edge as the product 370 is advanced along the conveyor belt 430 surface. It is recognized that the draft 10 and L-board 20 may be presented in a different orientation, for example, having the return flap 22 of the L-board as the leading portion of the product 30 as it is advanced along the conveyor belt surface; one skilled in the art will recognize the adjustments to the processes described herein may be necessary to accommodate the differing product initial orientation. As the draft and L-board of the product 370 moves along the conveyor belt 430, the absolute position of the product 370 is monitored at all times by the controller for the robotic arm 500, for example by using sensors and/or software as known to those of skill in the art. As the draft product 370 advances along the length of the first conveyor assembly 420, it will approach a predefined point on the first conveyor assembly, within the working range of the robotic arm 500, designated the pick up point, where the draft handler tool 200 will be deployed to pick up the product 370, as will be described.

Prior to the product 370 reaching the pick up point, the robotic arm 500 with the draft handler tool 200 securely coupled thereto may be directed to rest at a preliminary position. The preliminary position may be generally near the conveyor system 400, and at a safe travel height (in the vertical Y direction) that allows lateral movement of the robotic arm in a manner that will ensure the lowest point of the attached draft handler tool 200 will be clear of the height of any of the product 370 on the conveyor belt 430, or any equipment obstructions within the working range of the robotic arm 500, as can be seen with reference to FIG. 3. Typically, the safe travel height is one that has the lowest point of the draft handler tool at least 3 inches above the top surface of the conveyor belt 430.

As the product 370 is conveyed along the first conveyor assembly 420 by the movement of the conveyor belt 430, the product 370 enters into the working range of the robotic arm 500, and the draft handler tool 200 may be maneuvered by the robotic arm 500 to a first staging point, near the pick up point for the product 370. This first staging point is located such that center line of the draft handler tool 200 is generally in vertical alignment with the longitudinal center axis, along a longitudinal direction Z, of the first conveyor assembly 420. In an embodiment, this first staging point for the robotic arm 500 may position the draft handler tool as depicted in FIGS. 2 and 3, with the draft handler tool centered over the width of the conveyor belt 430, and as shown, the slide rail 286 is in longitudinal alignment with the centerline of the first conveyor assembly 420. The spatula 210 and the elastomeric band 250 are spaced in a vertical Y direction a short distance above the conveyor belt 430, typically slightly less than the length of the return flap of the L-board, and may be at a height of less than 2 inches above the conveyor belt 430.

Figure 5:
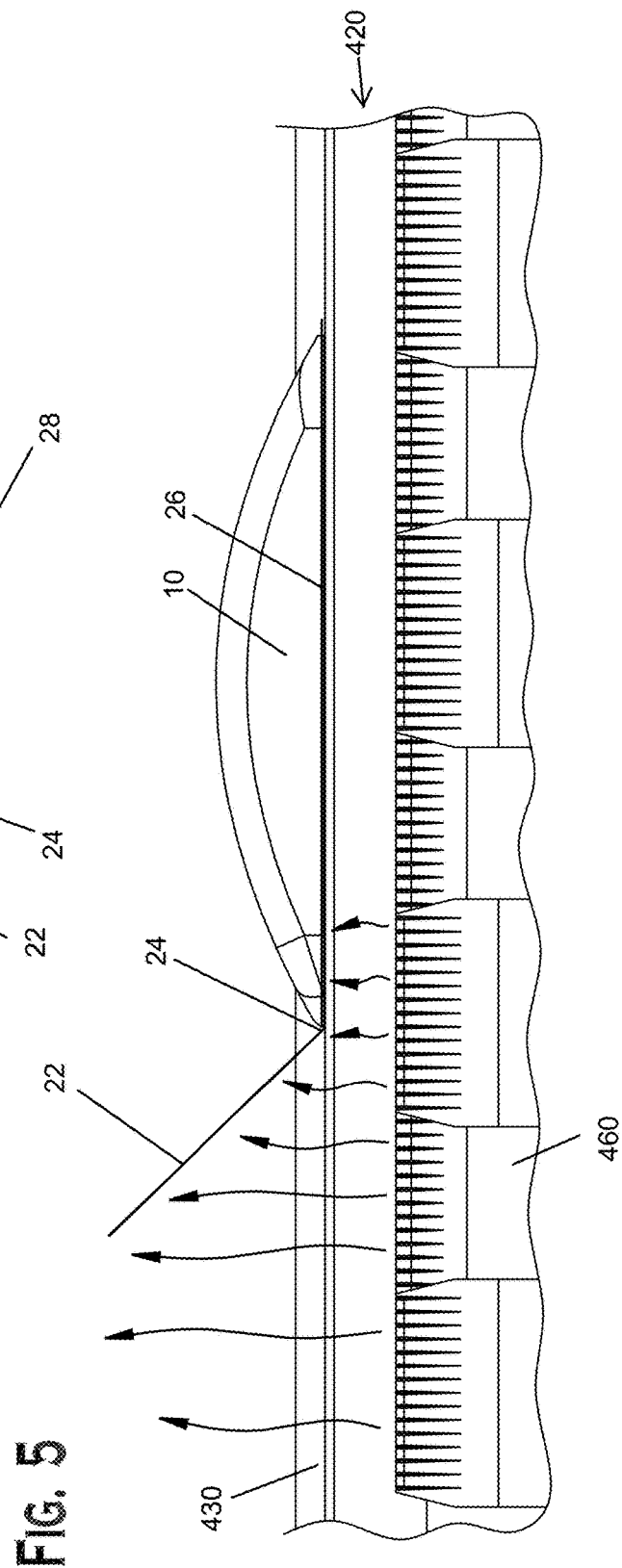
FIG. 5 is a partial, cross-sectional view of a product on a first conveyor assembly of FIG. 1.

With the draft handler tool 200 in staging position, the nozzles 460 arranged below the gap in the first conveyor assembly 420 will deliver a burst of gas, as can be seen with reference to FIG. 5. The pressure of the bursts from the nozzles 460 will cause the return 22 which is initially lying flat against the conveyor belt 430, to be raised up as shown in FIG. 5. The nozzles 460 can be seen to be positioned in end-to-end alignment, along a longitudinal direction Z, and have a combined length that exceeds the length of the return 22 of the L-board 20. As the positioning of the product 370 is tracked as it travels along the first conveyor assembly 420 by the robotic arm 500 or its controller (not shown), it is intended that only those nozzles 460 that are positioned below, or in the immediate vicinity of the return 22 would be activated to deliver the jet of pressurized gas escaping the nozzles, and can be selectively controlled by opening the automated valves 470 (depicted in FIG. 3) as needed to allow the flow of compressed gas from the manifold only to the appropriate nozzles 460. Selection and control of the automated valves may be determined by the controller that directs the movement of the robotic arm 500, though it is contemplated that one may utilize a different controller that receives the positioning information of the product 370 on the first conveyor assembly 420.

Figure 6:
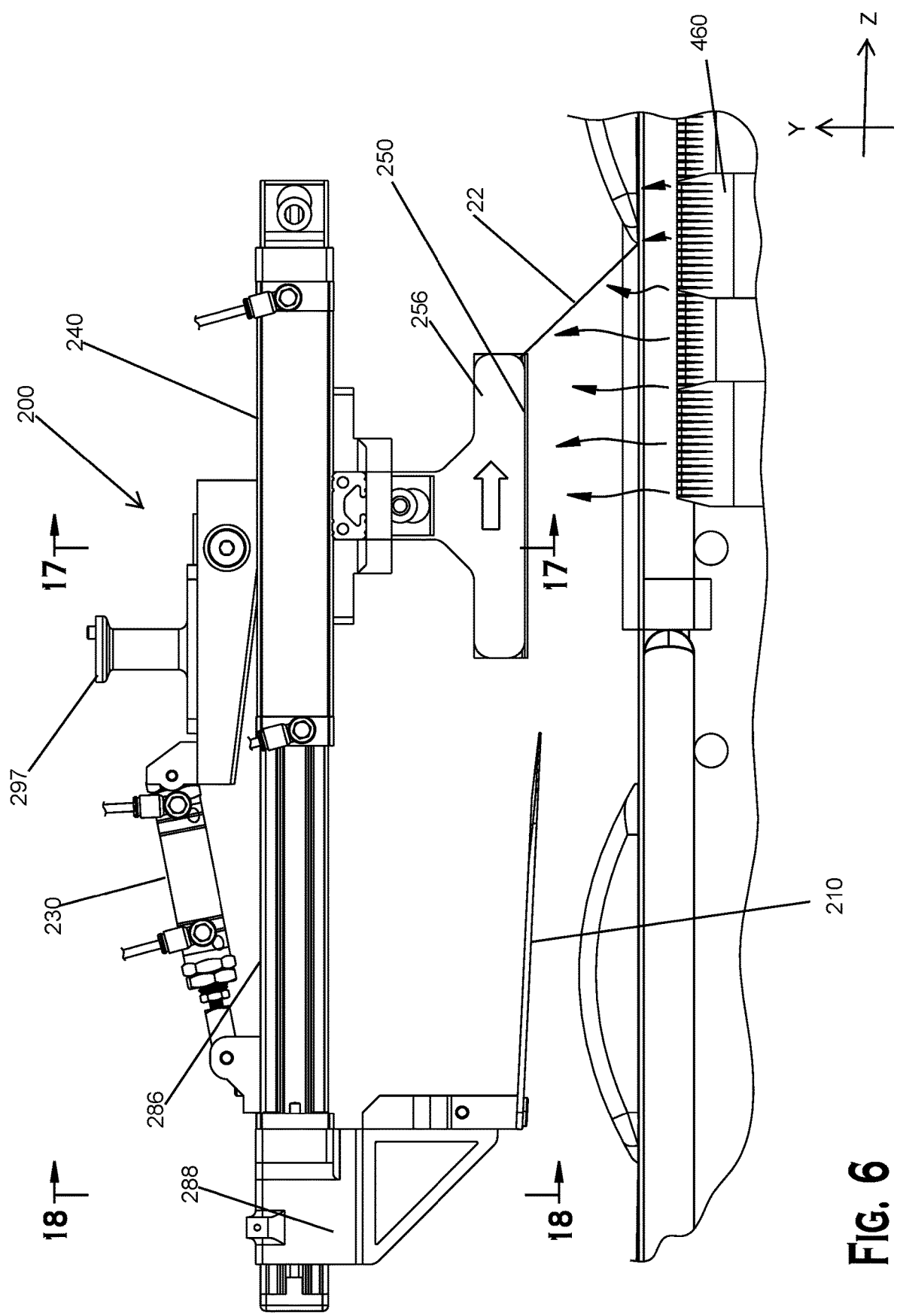
FIG. 6 is a sectional view of the draft handler tool and first conveyor assembly of the invention in use.

As can be seen with reference to FIGS. 5 and 6, the nozzles that are delivering the compressed gas serve create a lifting force from the upward flow of the jets streaming out from those nozzles 460, thereby causing the return 22 to pivot at the hinge 24, as force of the jets will raise the edge portion of the return 22 that is not weighted down by the shingle 10. The edge of the return 22, as shown in FIG. 6, is to be elevated to at least to a height such that the edge of the elastomeric band 250 of the draft handler tool 200 will encounter the return 22 as the draft handler tool 200 is translated in a Z-direction, relative to the position of the product 370, in the direction of the movement arrow shown. In an embodiment where the return 22 of the L-board 20 is located at the trailing end of the product 370, as the first conveyor assembly 420 is continuing to advance the products 370 along the conveyor belt 430, the movements of the robotic arm 500 must be faster than the movement of the products 370 on the first conveyor assembly, to create a speed differential through which the draft handler 200 advances over the product 370.

Figure 7:
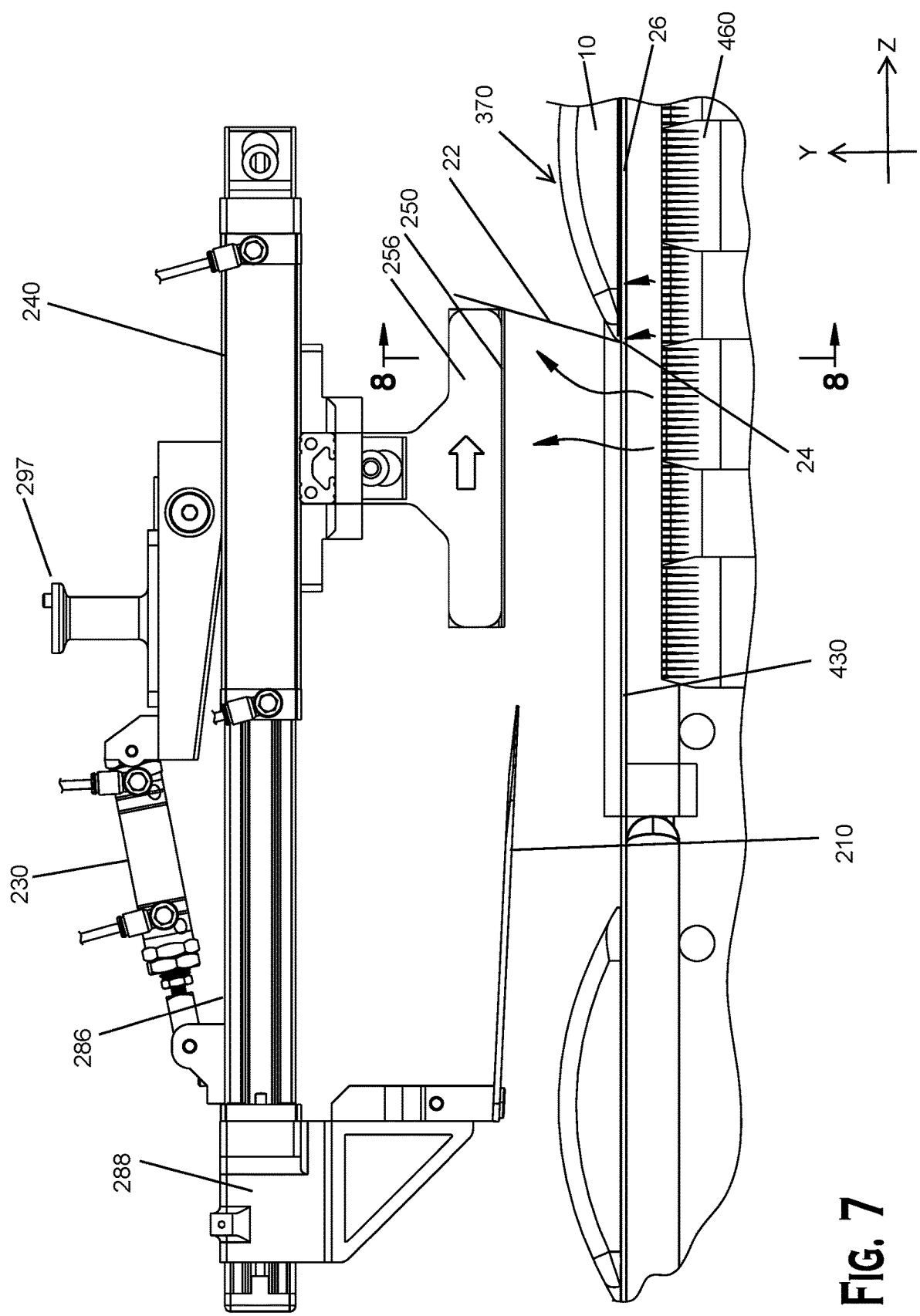
FIG. 7 is a sectional view of the draft handler tool and first conveyor assembly of the invention in use.

As shown in FIG. 7, continued advancement of the draft handler tool 200 in the direction shown by the arrow, will cause the leading edge of the elastomeric band 250 to further urge the folding of the return 22 at the hinge 24 beyond a vertical orientation, and creating an acute angle between then return 22 and the base board 26 of the L-board 20. In an embodiment, the movement of the draft handler tool 200 by the robotic arm 500, as shown in FIG. 7 is horizontal, or substantially so, and continues until the point at which the leading edge of the elastomeric band 250 is past the hinge 24, and approximately at the trailing edge of the shingle 10, as depicted in FIG. 7, at which point the directional movement of the draft handler tool, having been generally horizontal, is to shift to that depicted in FIG. 9, as will be discussed.

Figure 8:
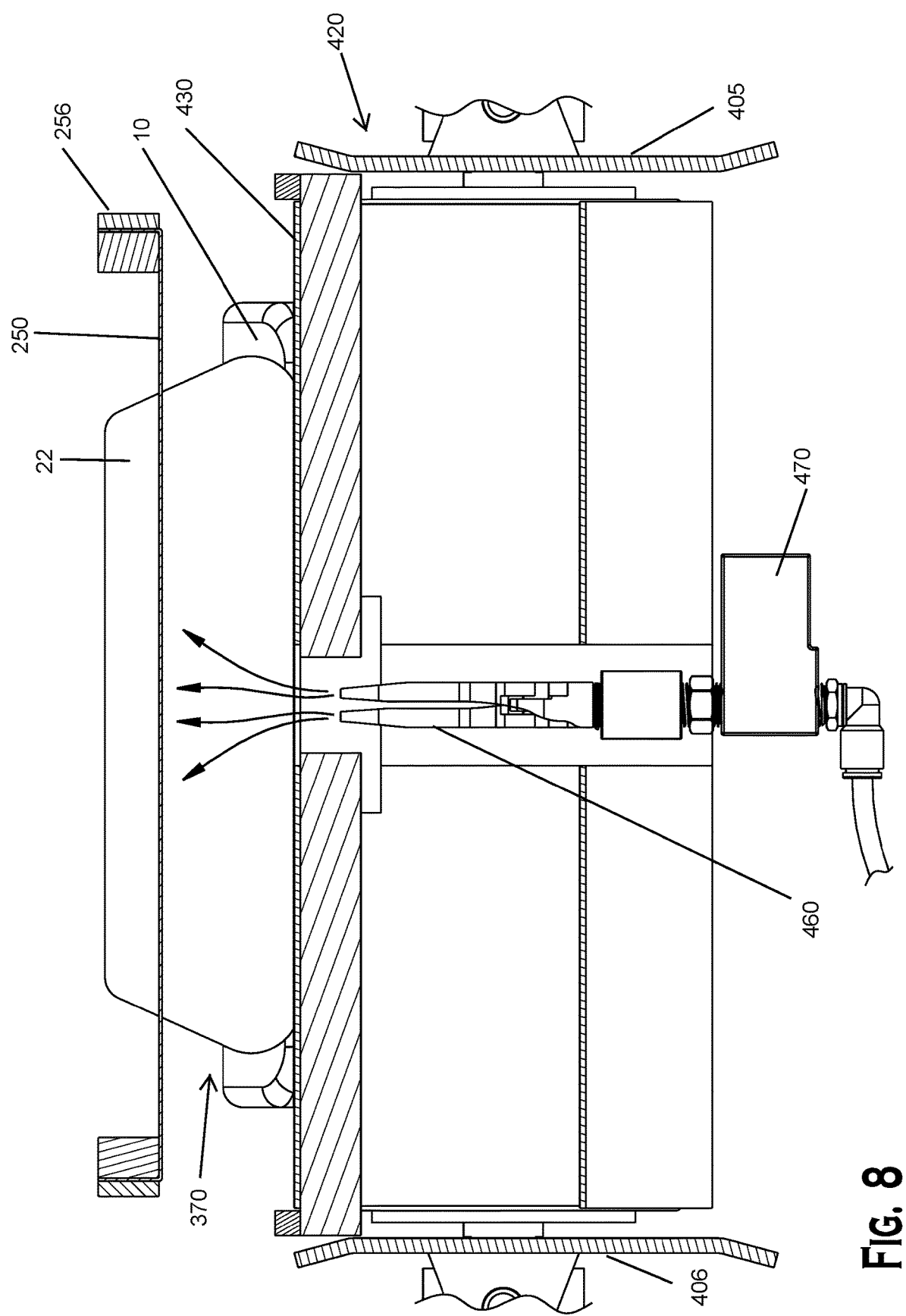
FIG. 8 is cross-sectional view of the first conveyor assembly and draft handler tool according to the invention taken along the line 8-8 of FIG. 7.

The relative positioning of the draft handler tool 200 and L-board 20 return 22 of FIG. 7 can be seen in cross-section view of FIG. 8, depicting the view along a Z-direction from behind the return 22. As shown, the nozzles 460 are delivering a stream of compressed gas, such as air, that is causing the L-board 20 to fold at the hinge 24, as the return 22 is pivoted up and away from the conveyor belt 430 of the first conveyor assembly 420. As can be seen, the robotic arm 500 has positioned the draft handler tool 200 in a position such that the elastomeric band 250 is at a height that will encounter the return 22 as the draft handler tool is advanced relative to the product 370 along in the Z-direction.

Figure 9:
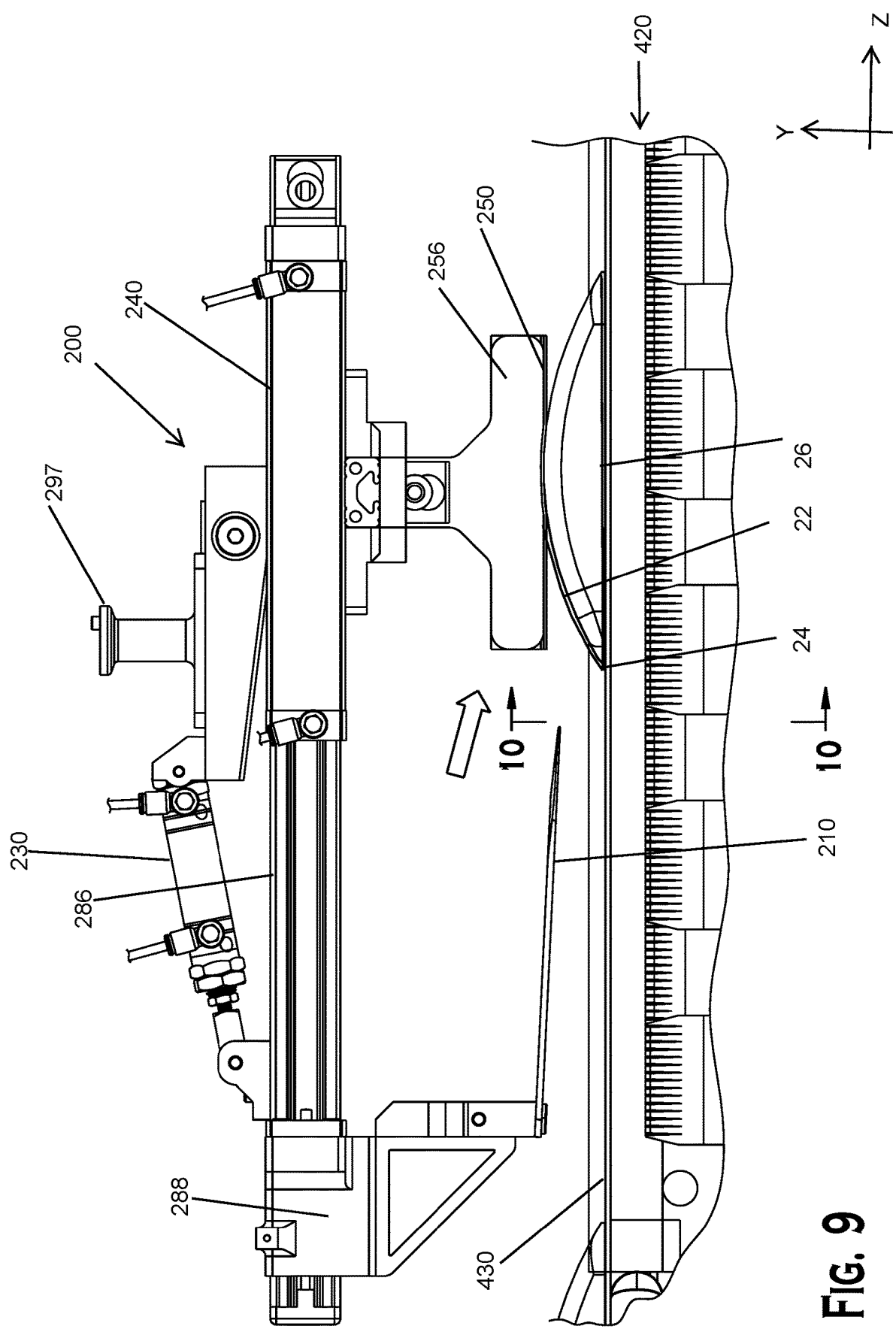
FIG. 9 is a sectional view of the draft handler tool and first conveyor assembly of the invention in use.

Once the elastomeric band has urged return 22 into an acute angle, relative to the base board 26 as shown in FIG. 7, the movement of the robotic arm 500 controlling the draft handler tool 200 can be shifted from that of the exclusively, or nearly so, horizontal direction of movement in a Z-direction, to a direction of movement that simultaneously has both a Z component and a Y component, as shown in FIG. 9 with the direction of movement indicated by the arrow. In this manner, the advancing draft handler tool 200 will have the elastomeric band 250 fold over the return 22 towards the shingle 10, and the downward movement in a Y-direction will compress the return 22 to conform against the upper surface of the shingle 10, as shown in FIG. 9. The movement of the draft handler tool 200 between the position depicted in FIG. 7, and until the position depicted in FIG. 9, is of greater magnitude for the Z component (forward), than for the Y component (downward).

Figure 10:
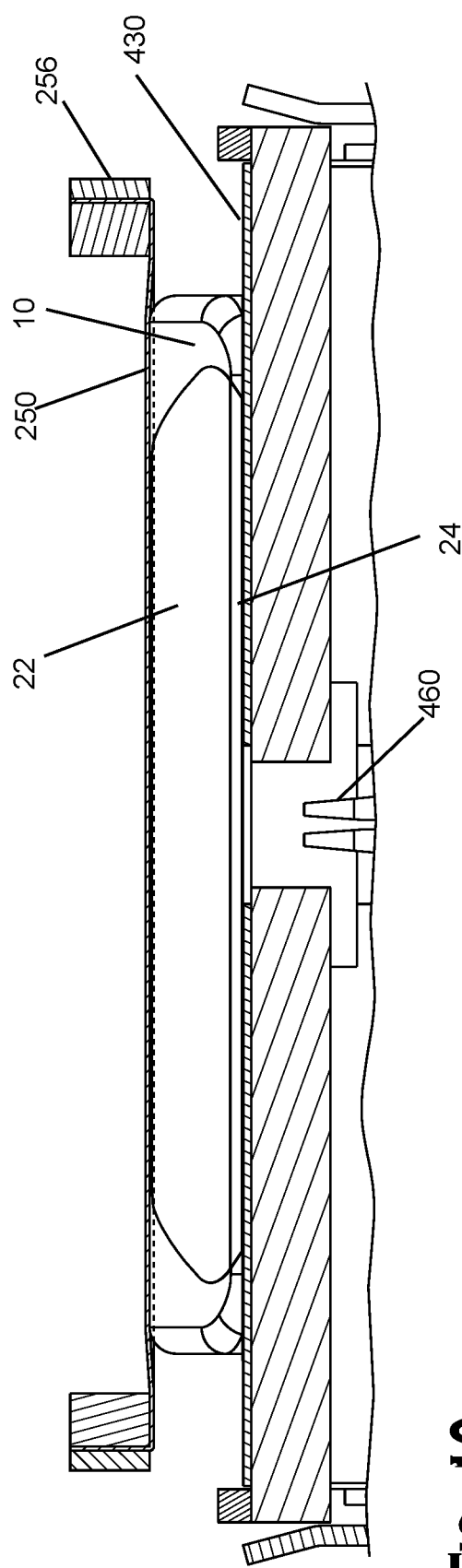
FIG. 10 is cross-sectional view of a portion of the first conveyor assembly and draft handler tool according to the invention taken along the line 10-10 of FIG. 9.

FIG. 10 depicts the cross-section view of the first conveyor assembly 420, showing the relative placement of the elastomeric band 250 and the return 22, in the position depicted in FIG. 9. As can be seen, the elastomeric band 250 is at a height that is approximately equal to that of the shingle 10, and has urged the return 22 to rest against the upper surface of the shingle 10, pivoting the return 22 at the hinge 24 to its maximum extent.

Figure 12:
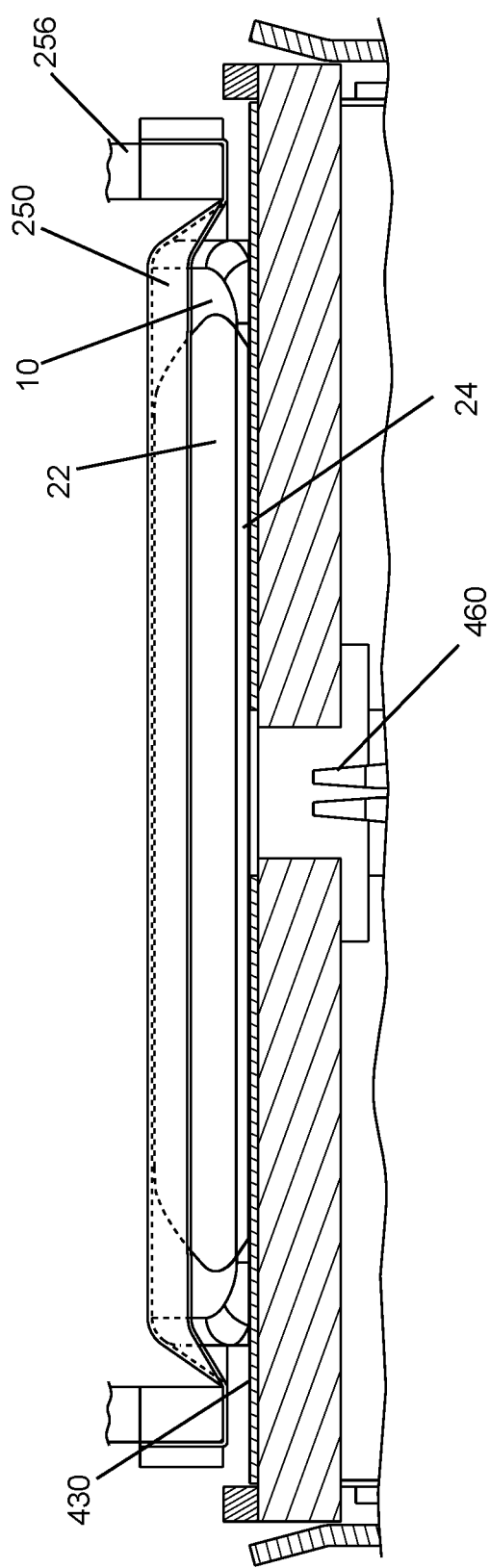
FIG. 12 is cross-sectional view of a portion of the first conveyor assembly and draft handler tool according to the invention taken along the line 12-12 of FIG. 11.
Figure 11:
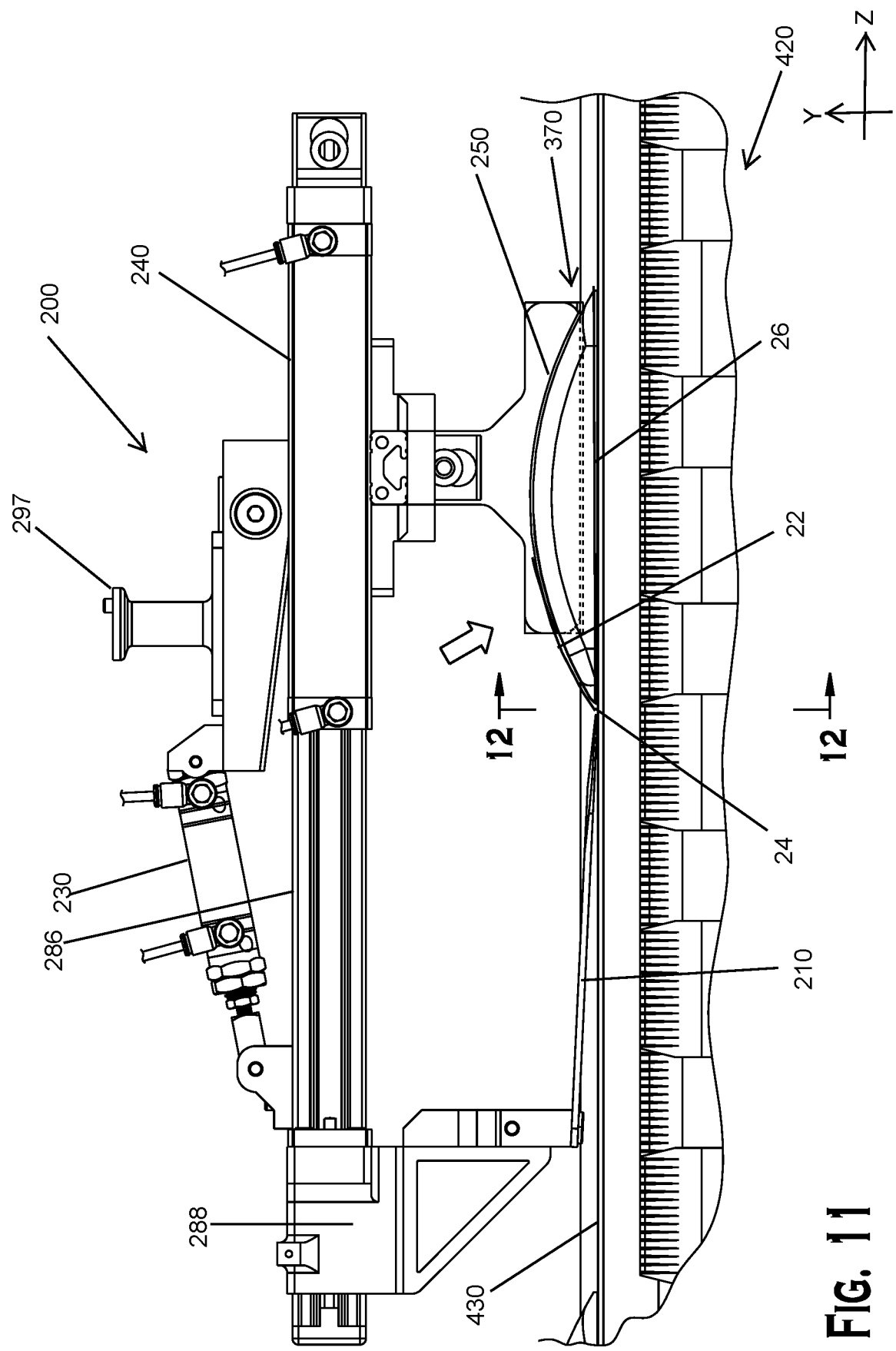
FIG. 11 is a sectional view of the draft handler tool and a portion of the first conveyor assembly of the invention in use.

Once the draft handler tool 200 has been moved to the position as depicted in FIGS. 9 and 10, where the elastomeric band 250 is approximately at the height that corresponds to the uppermost height of the shingle 10, and where the trailing edge of the elastomeric band 250 is generally in vertical alignment with the trailing edge of the shingle 10, the movement of the robotic arm 500 controlling the draft handler tool 200 can be shifted from the mostly forward, and slightly downward movement represented by the arrow in FIG. 9, to a mostly downward direction of movement, in that there is both a Z component (forward) and a Y component (downward), with the overall direction of movement being as indicated in FIG. 11 by the arrow. As indicated by the arrow in FIG. 11, the Y component is of a greater magnitude than that of the Z component. Note that the forward movement, the Z component, of the movement of the draft handler tool 200 while staging to pick up the product 370 will be at least as great as the movement of the product 370 along the conveyor belt 430, and must exceed the forward movement of the product 370 along the first conveyor assembly only when the draft handler tool 200 is called to advance relative to the position of product 370. With reference to FIG. 11, while the elastomeric band 250 is aligned over the product 370, the majority of the movement of the draft handler tool 200 can be to urge the elastomeric band 250 downward against the shingle 10 and return 22 of the L-board 20, while maintaining position in a Z direction with the product 370. In this manner, the elastomeric band 250 is stretched to conform over the dimensions of the shingle, as can be seen in FIG. 12, and thus the bottom surface of the elastomeric band 250 becomes a gripping surface as the elastomeric band stretches and secures the product in place relative to the draft handler tool 200. With reference to FIG. 11, the draft handler tool 200 as it is moved largely in a downward direction, will place the leading edge of the spatula 210 at a height the approaches the top surface of the conveyor belt 430 of the first conveyor assembly 420. When properly positioned in the Z-direction, the leading edge of the spatula 210 will be directly behind the hinge 24 of the L-board 20.

With reference to FIG. 13, the forward movement of the robotic arm 500 is to be maintained to match the forward movement, in the direction Z, of the product 370 on the first conveyor assembly 420, in order to maintain the relative positional relationship of the draft handler tool 200, and the product 370. The spatula 210 may then be advanced to slide underneath the product 370, where forward advancement of the spatula results from the actuation of the second pneumatic cylinder 240, causing the retraction of the piston rod into the barrel, and causing the slide mount 288 to travel along a portion of the length of the slide rail 286. The forward movement of the slide mount 288 will advance the spatula 210, as it is rigidly connected to the slide mount 288 by the spatula bracket 212. The elastomeric band 250 remains stretched over and gripping the top surface of the product 370, and thus prevents the advancing spatula 210 as it is sliding underneath the L-board 20 from causing unwanted movement of the product 370.

Figure 14:
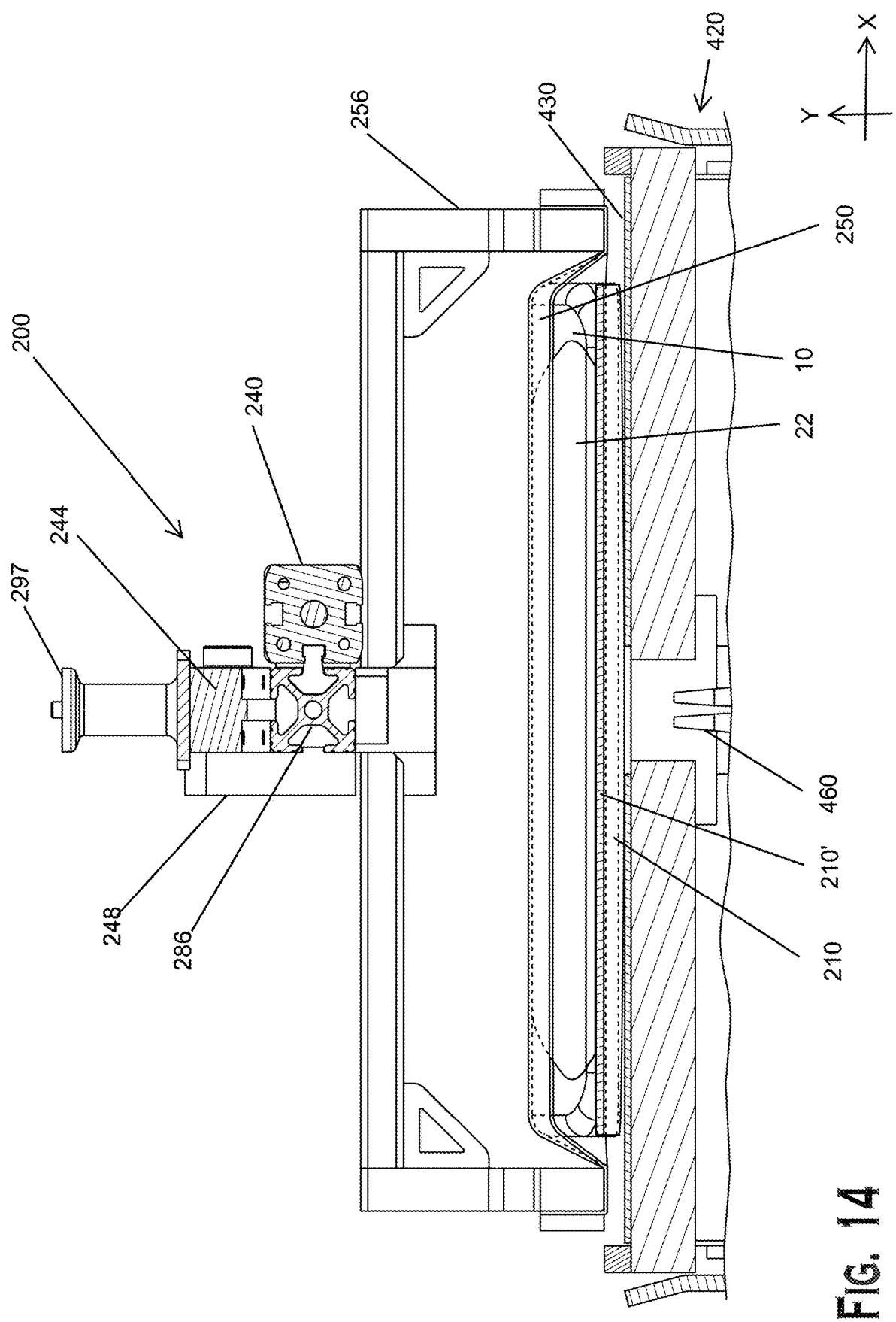
FIG. 14 is a cross-sectional view of a portion of the first conveyor assembly and draft handler tool according to the invention taken along the line 14-14 of FIG. 13.

With reference to FIG. 14, there is depicted a cross-section view of the spatula 210 as it is positioned below the L-board 20 and the shingle 10. As shown, the shingle 10 and L-board 20 are positioned atop the spatula 210. Note that the spatula 210 is slightly angled downwards, thus the cross-section of the spatula 210' is depicted, as well as the underside portion of the spatula 210 being visible in FIG. 14. The elastomeric band 250 remains stretched taut over the shingle 10, and gripping the product 370 and simultaneously pressing the return 22 against the upper surface of the shingle 10, as shown. As depicted, the elastomeric band is of greater dimensions than the product, and as it is stretched taut over the top surface of the product, also is caused to conform around the edges and top surface features, and may extend at least partially along the side surfaces of the product, and thereby restrains the product from unwanted movement as the robotic arm moves the draft handler tool an any of the X, Y, or Z directions, or combinations thereof. It is contemplated that in an embodiment, the elastomeric band stretched overtop of the product 370 will be able to secure the product in place against the spatula 210, and thus avoids the use of additional securement devices, such as springs or paddles that can apply a further restraining force against the product. It is contemplated that the elastomeric band-gripping surface, in some embodiments, may optionally provide surface texture features to increase the securement of the product against the elastomeric band, such as by incorporating ribs, dimples, or protrusions, that can rest against the surface features of the product.

With the spatula 210 advanced underneath the product 370, and the elastomeric band 250 securing the product position above the spatula 210, the pick-up of the product 370 can now be completed, by having the robotic arm 500 move vertically, in a direction Y, upwards away from the conveyor surface 430 in an amount that allows the lateral translation of the draft handler tool 200 within the working range of the robotic arm 500, without impacting the conveyor system 400, as can be seen in FIG. 1. The robotic arm 500 may thus move from a position above the first conveyor assembly 420, to a position above the second conveyor assembly 440, generally as depicted in FIG. 1, where the robotic arm 500 and draft handler tool 200 are depicted above the second conveyor assembly in phantom lines.

While the above described method of picking up the product 370 is described with the product being initially provided in an orientation with the return 22 towards the trailing end of the product, it is recognized that in an alternative embodiment, the product may be provided with the return 22 towards the leading end of the product 370 on a first conveyor assembly. One skilled in the art will recognize that adjustments to the methods that may be required for such an instance, and thus robotic arm 500 may be programmed to position the draft handler tool 200 in the vicinity of such product 370, adjusting the position, orientation, and movements of the draft handler tool relative to the product as it is conveyed along the conveyor assembly. Whereupon the elastomeric band would be caused to encounter the return 22 that has been deflected upwards by the nozzles, as previously described, and folding the return against the shingle 10 as the elastomeric band is stretched over the top of the product 370, whereupon the spatula 210 may be translated to slide underneath the product 370 for picking up the product 370, for placement on the second conveyor assembly, as will be discussed.

The draft handler tool 200, with the product 370 retained on the spatula 210 by the elastomeric band 250, as previously described, may then be moved laterally between the first and second conveyor assemblies 420, 440, and in some embodiments of the conveyor system 400, the orientation of the product 370 may need to be reversed, by rotating an amount, such as 180 degrees, so that the hinge 24 of the L-board 20 will be the leading edge when the product 370 is placed on the second conveyor assembly 440. This may be seen with reference to FIG. 1, where the movement of both the first and second conveyor assemblies are depicted as being from left to right. As can be seen with reference to FIG. 15, the rotation of the draft handler tool 200, if needed, can be achieved by rotating the robotic arm 500 about the theta axis, as will be familiar to those skilled in the art. The draft handler tool 200 necessarily rotates synchronously with the robotic arm, due to the secured connection at the robotic coupler 297, with the rotation represented by the direction of movement arrow about the vertical axis at the robotic coupler 297. Additionally, the rotation of the draft handler tool 200, if any, will necessarily change the orientation of the product 370, as it is secured on top of the spatula 210 of the draft handler tool 200.

To maximize efficiency of movement, the rotation of the robotic arm 500, if required, may be programmed to occur during lateral movement, though it is contemplated that the rotation of the robotic arm 500 may alternatively be performed before, or after, the lateral movement of the robotic arm 500 between conveyor assemblies 420, 440. In this manner, the orientation of the product 370 may be reversed as needed, while the robotic arm 500 is moved laterally in the plane created by the axes Z and X, moving between the first and second conveyor assemblies 420, 440 to position the draft handler tool 200 above the second conveyor assembly 210, such that the product 370 may be placed onto the second conveyor assembly 440, as will be discussed.

Figure 15:
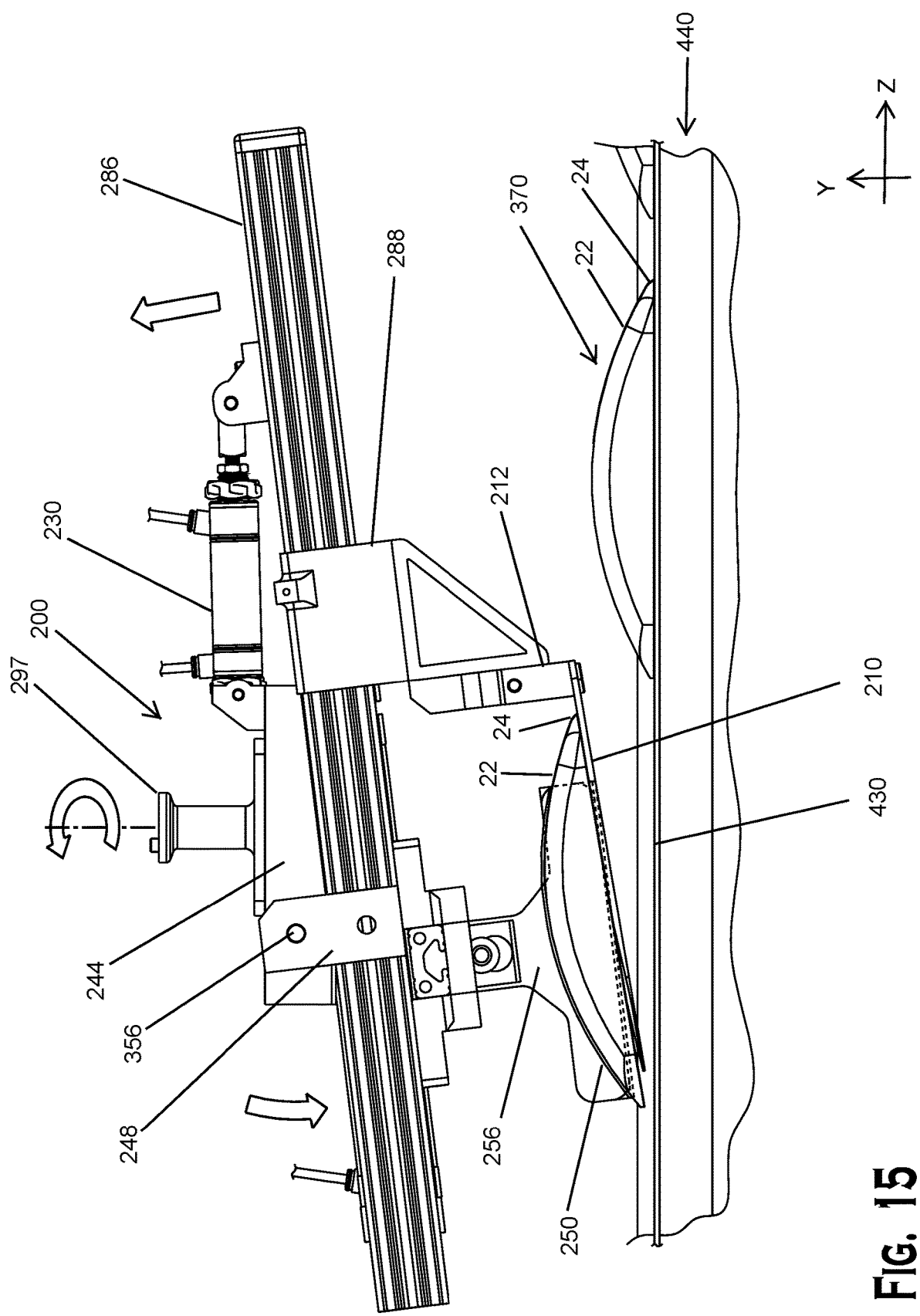
FIG. 15 is a sectional view of the draft handler tool and a portion of the first conveyor assembly of the invention in use.

Furthermore, as can be seen with reference to FIG. 15, the first pneumatic cylinder may be actuated to cause the piston rod to be retracted into the barrel, shortening the effective length of the first pneumatic cylinder, and causing the slide rail 286 to be tilted, relative to horizontal, as shown by the direction of movement arrows above opposing ends of the slide rail 286. The slide rail may thus be initially in a horizontal position when the first pneumatic cylinder is at its full length, and then be tilted as the first pneumatic cylinder is actuated. The slide rail 286 may be caused to tilt about a pivot 356, where pivotable arm 248 that supports the slide rail 286, is pivotably secured relative to the main bracket 244. In an embodiment, the slide rail 286 may have a tilt away from horizontal that is more than 3 degrees, more than 5 degrees, more than 7 degrees, more than 9 degrees; and may have a tilt that is less than 10 degrees, less than 8 degrees, less than 6 degrees, less than 4 degrees from horizontal. In an embodiment, the slide rail is to be tilted approximately 7 degrees from horizontal. The extent of the tilt may be adjusted based on the height of the products being processed, where a taller product may require more tilt to the slide rail 286, and a shorter product may require less tilt to the rail 286, as will be understood by those of skill in the art. The tilting of the slide rail 286 causes the spatula 210 to be angled further downwards, with an increased downward slope of the spatula when viewed from the spatula bracket towards the arcuate edge. This increased slope may assist in sliding the product 370 off the spatula 210 as it is being retracted, as will be discussed. Moreover, the tilt of slide rail 286 affords greater clearance below the spatula 210 as it is being retracted, as will be discussed. As with the rotation of the draft handler tool 200, the actuation of the first pneumatic cylinder 230 may be timed to occur as the robotic arm 500 is laterally repositioned between conveyor assemblies 420, 440, though it is contemplated that the tilting of the slide rail 286 may occur before, or after the lateral movement of the robotic arm 500. In an embodiment, the robotic arm 500 may simultaneously move laterally between conveyor systems, rotate to the extent necessary to reverse the orientation of the product 370, and actuate the first pneumatic cylinder to tilt the slide rail 286.

Figure 16:
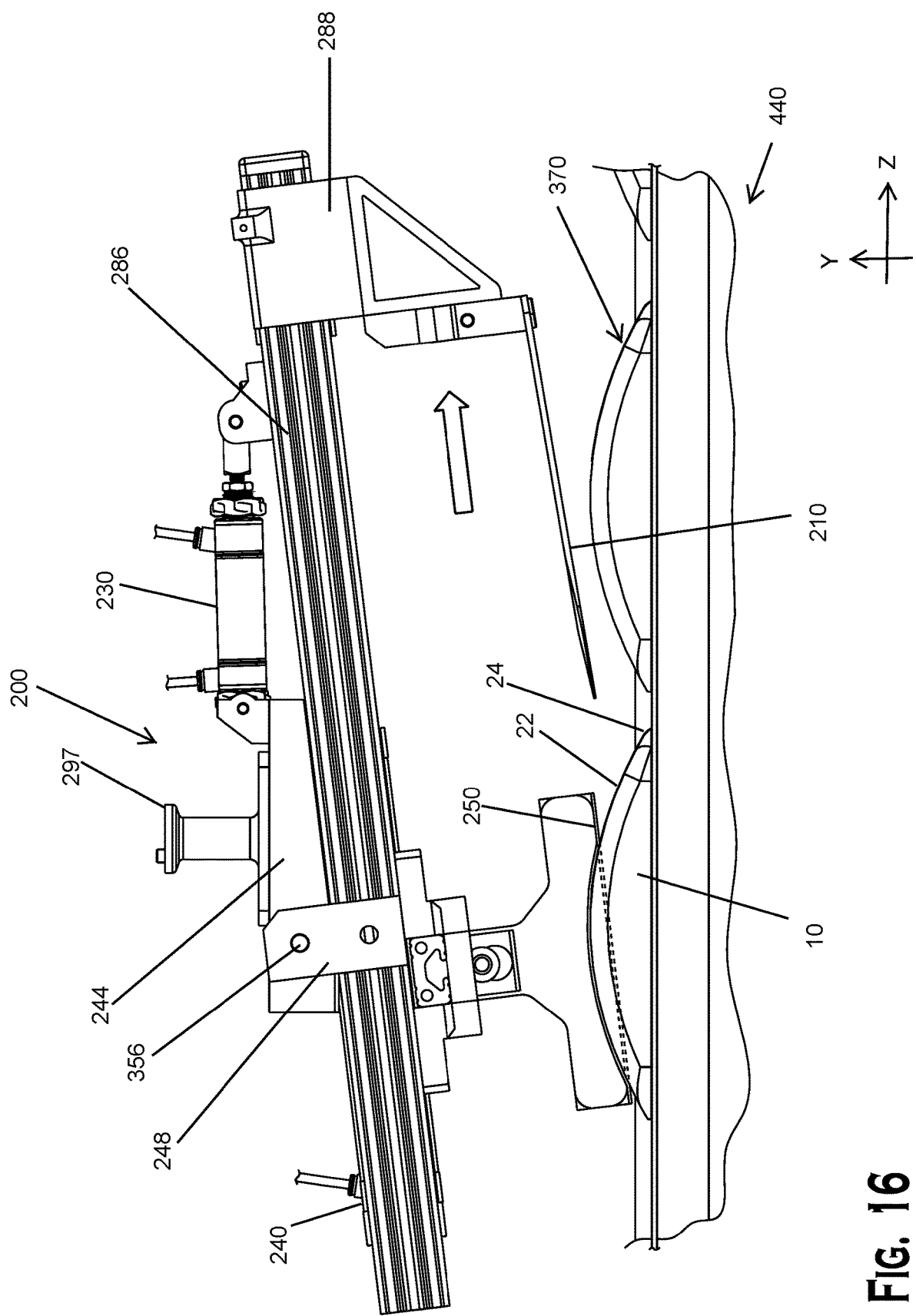
FIG. 16 is a sectional view of the draft handler tool and a portion of the second conveyor assembly of the invention in use.

FIG. 15 depicts the draft handler tool 200 positioned above the second conveyor assembly 440, for placing of the product 370 thereupon. In the embodiment shown in FIG. 15, the optional rotation of the draft handler tool 200 to adjust the orientation of the product 370 is depicted by the movement arrow. As noted previously, the rotation is only necessary where the orientation of the product 370 is to be changed between the first and second conveyor assemblies, or to accommodate the relative alignment of the first and second conveyor assemblies, which adjustments will be understood by those skilled in the art. As depicted in FIG. 15, the slide rail 286 may be tilted somewhat, as previously discussed, and the elastomeric band 250 remains stretched over the product 370, securing it in place over the spatula 210, as described previously. The robotic arm 500 has positioned the draft handler tool 200 so that the arcuate edge of the spatula 210 may be at, or approaching the surface of the conveyor belt 430 of the second conveyor assembly 440, as shown. As depicted in FIG. 16, the second pneumatic cylinder 240 may then be actuated to cause the piston rod to be extended out, returning the second pneumatic cylinder to an extended position, and thereby causing slide mount 288 to slide along the rail 286, and moving the spatula 210 so that is retracted away from underneath product 370. During the movement of the spatula 210, the product 370 is prevented from moving with the spatula 210, due to being restrained by the elastomeric band 250 stretched over top of the product 370. Additionally, the downward tilt of the spatula 210 eases the sliding removal of the product 370 from the spatula 210, as gravity and the downward pressure from the stretched elastomeric band 250 would urge the product 370 to slide down the spatula, rather than be drawn backwards as the spatula is retracted. With the spatula 210 removed from supporting the product 370, the product will be placed or allowed to drop onto the surface of the conveyor belt 430 of the second conveyor assembly 440. The second conveyor assembly may then convey the placed product along for further processing, for example, thermoforming or other suitable packaging, as desired.

As can be seen in FIG. 16, the slide rail 286, as it is tilted by the actuation of the first pneumatic cylinder 230, may be seen to provide additional clearance below the spatula 210 as it is retracted out from under the product 370, effectively increasing in height as the slidable mount 288 is caused to moved up the rail 286, tilted as shown. In this manner, the draft handler tool 200 can be placed with the product 370 close to the conveyor belt 430, and thereby ensure accurate and reliable placement of the product 370 on the second conveyor assembly 440. It is contemplated that additional tilt to the slide rail 286 may be employed where there is a need to increase the clearance below the retracted spatula 210, for example, where the draft handler 200 is handling products with a greater height dimension than as shown, and similarly, less tilt may be required for products with lesser height dimensions than shown.

In an alternative method, the ability to tilt the slide rail 286 may not be utilized, or in an alternative embodiment of the draft handler tool, the first pneumatic cylinder 230 may be absent entirely. In such instances, the draft handler tool 200 may be positioned above the second conveyor assembly 440 at a height that allows the product 370 to be removed as above (without tilting the slide rail), and positioned such that there is a small drop to the conveyor surface 430 from the spatula 210. In such an instance, the spatula 210 may be placed at a height that is at least slightly above the height of the top surface of the product 370, such that the spatula 210, as it is retracted out from under the product 370 does not contact a previously deposited product on the second conveyor assembly. Alternatively, the alternative draft handler tool, without the ability or requirement to tilt the slide rail, may also be possible where the spacing of the products 370 on the second conveyor assembly 440 is increased to the point that the spatula 210 can be retracted without colliding with the previously deposited product 370.

In any of the embodiments, once the product 370 has been removed from the spatula 210, the draft handler tool 200 may be raised to a safe travel height that allows lateral movement of the robotic arm, to return to the first conveyor assembly. The first pneumatic cylinder 230 may again be actuated, if necessary, to return the slide rail 286 to a horizontal positioning. Subsequently, the robotic arm 500 and draft handler tool 200 can be returned to the first staging point depicted in FIG. 2 for continued processing of products 370 being conveyed on the first conveyor assembly 420.

In an embodiment, the draft handler tool 200 may optionally provide for a folding mechanism 600 that serves to aid in the folding and may form a crease in the L-board 20 at the hinge 24, so that the return 22 may be prevented from returning to the initial flat orientation, as the draft handler tool 200 is removed, and the elastomeric band is no longer urging the return 22 against the shingle 10. This may be necessary where the construction of the L-board, such as the thickness or material of the L-board, or even the extent or quality of perforations along the hinge 24 are such that the return 22 would otherwise tend to revert to the original unfolded initial position after being placed onto the second conveyor assembly. An exemplary folding mechanism 600 is provided on an alternative embodiment of the draft handler tool 200, depicted in FIGS. 20-22, which in addition to the elements previously described where like numbers refer to like items, the embodiment further provides the components for a folding mechanism 600, as will be described.

Figure 20:
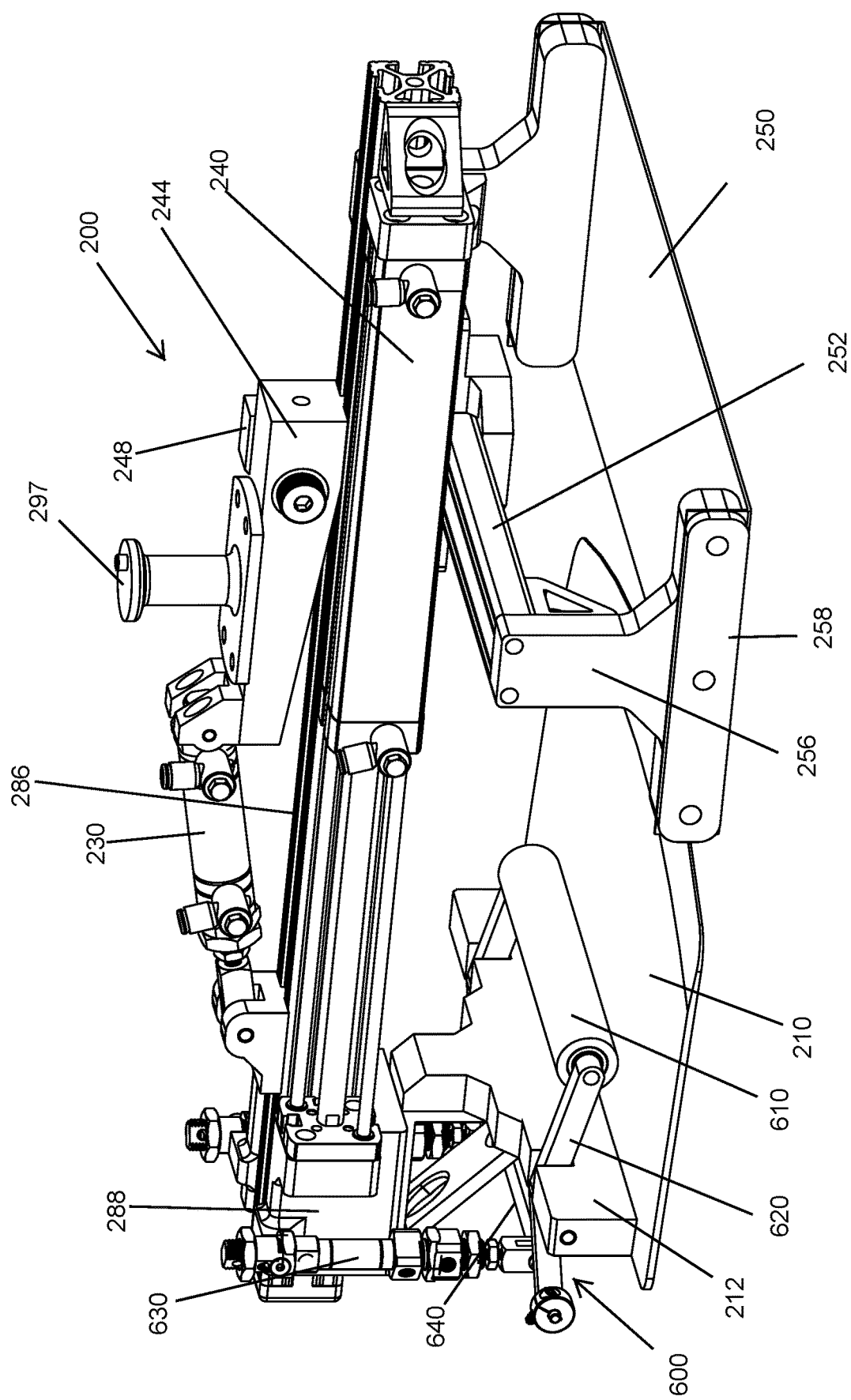
FIG. 20 is a perspective view of an alternative embodiment of a draft handler tool according to the invention.

With reference to FIG. 20, the alternative embodiment of the draft handler tool 200 further providing the folding mechanism 600 is shown having a roller 610, at least one pivot arm 620, at least one actuator 630, and optionally, a linking rod 640. The folding mechanism 600 is secured to the spatula 210 and/or slide mount 288 for the spatula, in such a manner that as the spatula 210 is caused to be moved by the actuation of the second pneumatic cylinder 240, as previously described, the folding mechanism 600 will move with the spatula 210.

The folding mechanism 600 may have at least one actuator 630, and as can be seen with reference to FIG. 20, there may be provided a pair of actuators 630 for the folding mechanism 630. The actuators may be any suitable form of linear actuator, including electric actuators, hydraulic actuators, compressed gas or mechanical spring devices, or as shown, pneumatic actuators. The actuators 630 are provided with a fixed end that is fixedly secured to the slide mount 288, and has a free end that can be moved in a vertical direction, as the actuators 630 are actuated, such as by varying the compressed gas pressures delivered to the actuator, or in response to the roller encountering the product 370, as will be discussed. The one or more actuators 630 may have at least one port for varying gas pressure to the actuator. A compressed gas may be delivered through a line in fluid communication with a source of air pressure. The air pressure to the actuator may be controlled by an automated valve that can be controlled by a controller, which may be the same or different from the controller for the robotic arm 500. Alternatively, the actuator may be subjected to a consistent gas pressure, such that there is maintained an urging force on the actuator, to urge the roller against the spatula 210, as will be described. As can be seen with reference to FIG. 22, the fixed end of the actuator 630 secured to the slide mount 288 is the barrel end of the pneumatic actuator 630, and the free end is the piston rod end portion of the pneumatic actuator.

Figure 21:
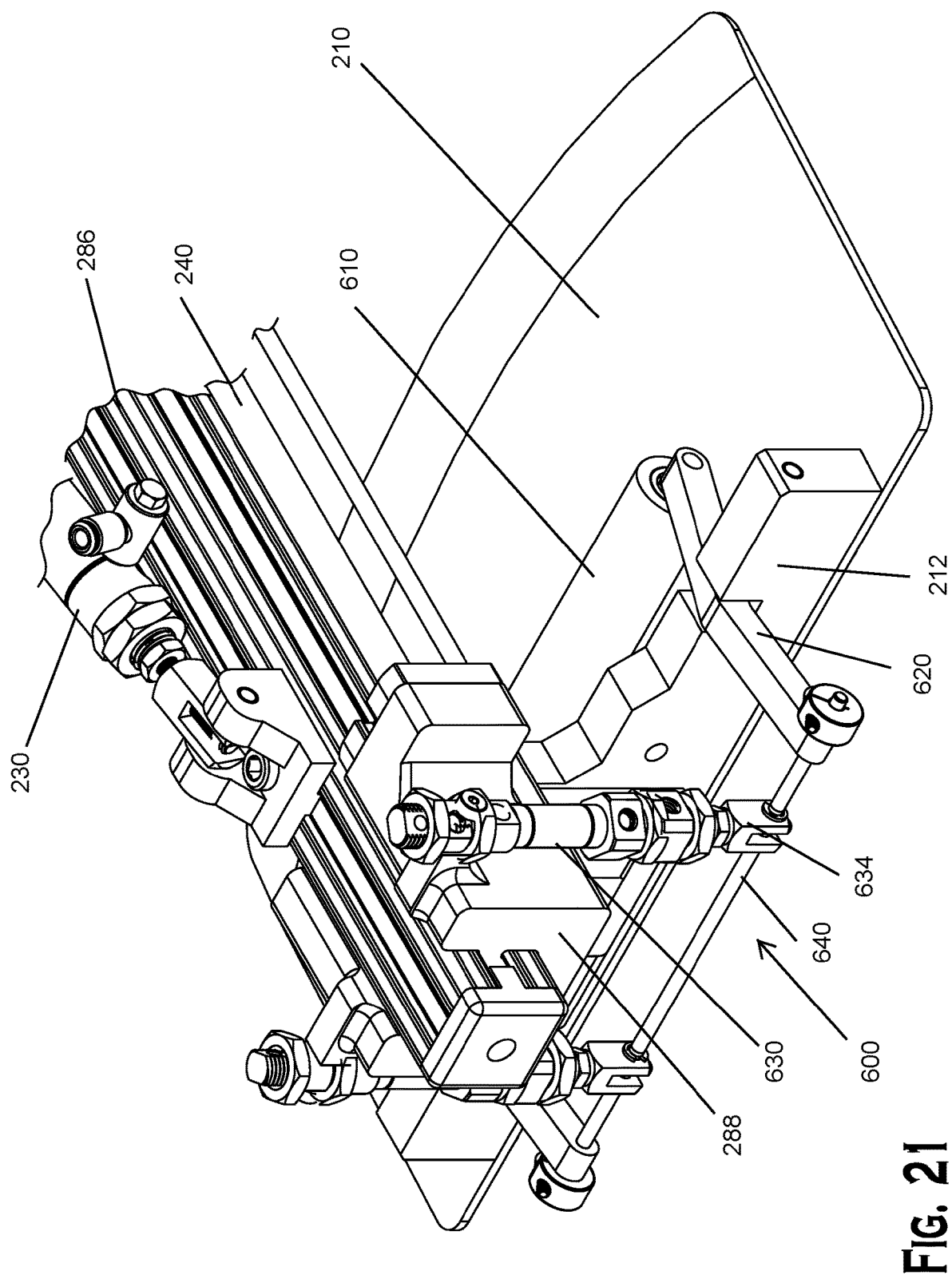
FIG. 21 is a top perspective view of the alternative embodiment of the draft handler tool of FIG. 20.

With reference to FIG. 21, the free end of the pneumatic actuators 630 may be connected to a linking rod 640, such as through yoke 634 at the end of the piston rod and through which the linking rod 640 may be directed. The linking rod 640 is in turn, connected at each end to a pair of pivot arms 620. In an embodiment having a single pneumatic actuator 630 (not shown), the linking rod may be absent, and the free end of the pneumatic actuator may be secured directly to one end of a single pivot arm 620.

Figure 22:
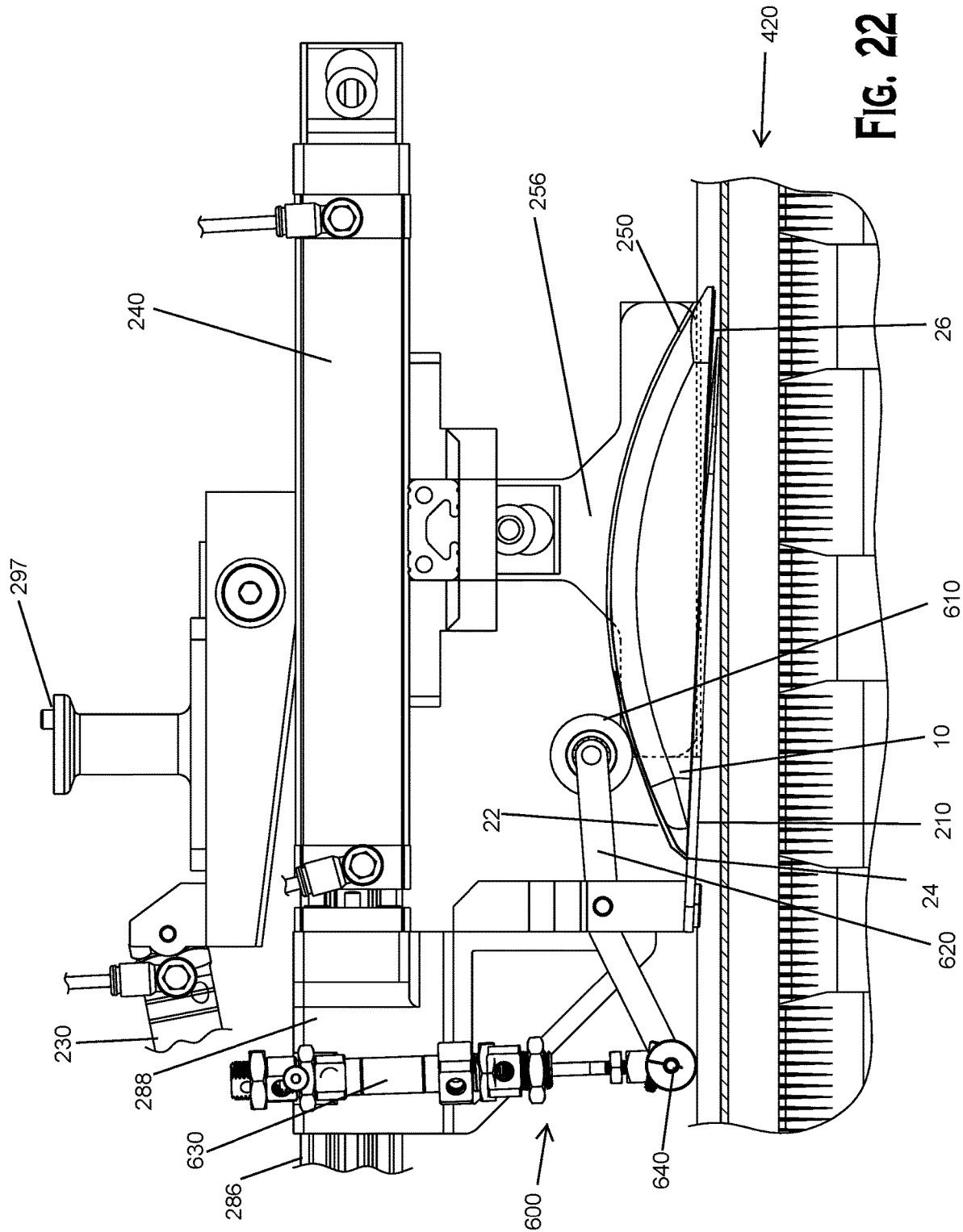
FIG. 22 is a side view of a portion of the first conveyor assembly and the alternative draft handler tool of FIG. 20 in use.

As shown in FIGS. 20-22, each pivot arm 620 is extended between the linking rod 640, and a roller 610 at the other. The pivot arm 620 is pivotably secured to the spatula bracket 212, with the pivotable securement serving as a fulcrum for the pivot arm to act as a lever, whereby an upward lifting force exerted by the actuator 630 applied to the pivot arm 620, optionally through linking rod 640, will cause pivot arm to pivot at the spatula bracket 212, and urge the roller 610 downwards towards the spatula 210.

As depicted in FIG. 22, the spatula 210 has been slid underneath a product 370 on the first conveyor assembly 420. In the course of advancing the spatula 210 as the second pneumatic cylinder 240 is actuated as discussed previously, the roller 610 which is urged against the top surface of the spatula 210, would roll over and up as it encounters the L-board and then shingle 10 which would have been positioned with the return 22 folded over and constrained by the elastomeric band 250 (as shown in FIGS. 11 and 13). Thus, as shown in FIG. 22, the roller as it is advanced together with the spatula 210, would roll over the hinge 24 of the L-board 20, and be forced to roll up the return on top of the shingle 10, to the position shown. The downward pressure of the roller 610 as it rolls over the hinge 24 would form a crease in the L-board 20, similar to manually folding a paper and applying pressure over the fold to form a crease.

It is contemplated that an alternative form of folding mechanism may be employed and will be familiar to those of skill in the art, for example the roller may be substituted with, for example, a pneumatically operated press mechanism (not shown) may apply pressure over the length of the hinge 24, which may be actuated when the spatula 210 is positioned underneath the product 370, with the press being urged against the L-board hinge to create the crease, and then may be retracted, rather than rely on the roller embodiment shown.

The foregoing illustrates some of the possibilities for practicing the invention. Many other embodiments and fields of use for the draft handler system 1 are possible and within the scope and spirit of the invention. It is, therefore, intended that the foregoing description be regarded as illustrative rather than limiting.

What is claimed is:

1. A draft handler comprising:
   a tool stem adapter mountable to a robotic arm;
   a spatula capable of being moved relative to the position of the tool stem adapter,
   a first pneumatic cylinder configured to reversibly tilt the spatula relative to the tool stem adapter, and a second pneumatic cylinder configured to reversibly translate the spatula in a longitudinal direction between a first position and a second position, and an elastomeric band extended between a pair of band frame components, the elastomeric band having a leading edge and a grip surface, the leading edge configured to urge an L-board return into an acute angle relative to a base board of the L-board with a generally forward motion of the draft handler, and the grip surface configured to be pushed against and conform to an upper surface of a draft with a generally downward motion of the draft handler.

2. The draft handler of claim 1, wherein the spatula is positioned behind the elastomeric band while in the first position, and the spatula is advanced to be positioned at least partially below the elastomeric band while in the second position.

3. The draft handler of claim 2, wherein the spatula in the second position is positioned below the draft, and the elastomeric band is positioned above the draft.

4. The draft handler of claim 1, further comprising a slide rail, a slide mount, and a spatula bracket securing the spatula to the slide mount.

5. The draft handler of claim 4, further comprising a pair of band frame arms having band brackets at the ends thereof, each of the band brackets configured to secure an end of the elastomeric band.

6. The draft handler of claim 5, wherein the slide mount is configured to reversibly move along a portion of the length of the slide rail in response to actuation of the second pneumatic cylinder.

7. The draft handler of claim 1, wherein the elastomeric band is a silicone elastomer band having a relaxed length, and is capable of being repeatedly stretched up to 150% of the relaxed length, and being capable of elastically seeking to return to its relaxed length.

\* \* \* \* \*